(12) United States Patent
Kamila et al.

(10) Patent No.: US 11,981,426 B2
(45) Date of Patent: May 14, 2024

(54) COMPOSITE SPARS WITH INTEGRATED SACRIFICIAL SURFACES

(71) Applicant: The Boeing Company, Chicago, IL (US)

(72) Inventors: Eric Sean Kamila, Edmonds, WA (US); Joseph Lee Sweetin, III, Leavenworth, WA (US); Josephine LaCoe, Seattle, WA (US); Chilip Chan, Seattle, WA (US); Clifford D. Borowicz, Mukilteo, WA (US); Roozbeh Chavoshian, Kenmore, WA (US); Ian Edward Schroeder, Seattle, WA (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 17/510,378

(22) Filed: Oct. 26, 2021

(65) Prior Publication Data
US 2022/0212777 A1 Jul. 7, 2022

Related U.S. Application Data

(60) Provisional application No. 63/134,071, filed on Jan. 5, 2021.

(51) Int. Cl.
| | |
|---|---|
| *B64C 3/18* | (2006.01) |
| *B64C 3/20* | (2006.01) |
| *B64C 3/26* | (2006.01) |
| *B64F 5/10* | (2017.01) |

(52) U.S. Cl.
CPC ............... *B64C 3/185* (2013.01); *B64C 3/20* (2013.01); *B64C 3/26* (2013.01); *B64F 5/10* (2017.01)

(58) Field of Classification Search
CPC ... B64C 3/185; B64C 3/20; B64C 3/26; B64F 5/10; B29C 2795/009
See application file for complete search history.

(56) References Cited

U.S. PATENT DOCUMENTS

| | | | |
|---|---|---|---|
| 5,216,799 A | 6/1993 | Charnock et al. | |
| 6,234,423 B1 | 5/2001 | Hirahara et al. | |
| 10,974,465 B2 | 4/2021 | Moore et al. | |
| 11,673,644 B2 * | 6/2023 | Kamila | B29D 99/0003 428/119 |

(Continued)

FOREIGN PATENT DOCUMENTS

| | | |
|---|---|---|
| GB | 2575280 A | 1/2020 |
| JP | 5476916 B2 | 4/2014 |
| RU | 2749432 C1 | 6/2021 |

*Primary Examiner* — Robert B Davis
(74) *Attorney, Agent, or Firm* — Duft & Bornsen, PC

(57) ABSTRACT

Composite assemblies are described that include composite spars that are co-cured with one or more sacrificial members on their flanges, forming an integrated sacrificial surface for the composite spars. In one embodiment, the composite assembly includes a composite spar having a web and flanges that project from sides of the web. The composite assembly further includes a sacrificial member of composite materials co-cured with the composite spar on an outer surface of at least one of the flanges. In addition, the sacrificial member has an outer surface that has been machined into conformance with an inner surface of at least one skin panel for an aircraft structure to form a contact surface with the at least one skin panel.

20 Claims, 29 Drawing Sheets

(56) References Cited

U.S. PATENT DOCUMENTS

2016/0257427 A1    9/2016  Humfeld et al.
2017/0274577 A1*   9/2017  Burns ................... B64C 1/064
2019/0184648 A1*   6/2019  Boeck ................... B29C 66/43

* cited by examiner

COMPOSITE SPARS WITH INTEGRATED SACRIFICIAL SURFACES

RELATED APPLICATIONS

This non-provisional patent application claims priority to U.S. Provisional Patent Application No. 63/134,071 filed on Jan. 5, 2021, which is incorporated by reference as if fully provided herein.

FIELD

This disclosure relates to the field of aircraft structures, and in particular, to aircraft structures that utilize spars as structural members.

BACKGROUND

During a wing assembly process for an aircraft, ribs and spars are assembled to form a skeleton for the wing. The spars typically form the main structural member of the wing, and run along a length of the wing. The ribs are attached to the spars (e.g., the ribs may be attached to a front spar at a leading edge of the wing and a rear spar at a trailing edge of the wing), and the ribs generally have a perimeter shape that defines the airfoil for the wing. The outer surface of the wing is formed by skin panels that are attached along the perimeter of the ribs and the perimeter of the spars to form a smooth surface for the wing.

In order to ensure a proper fit of the skin panels to the spars, shims may be installed at the perimeter of the spars where the inside surfaces of the skin panels contact the spars. The shims are used in order to preclude a possible machining process on the spars themselves, which may negatively impact the structural integrity of the spars.

Typically, installing the shims onto the spars is time consuming manual process, which entails additional man-hours of assembly time and disassembly time for a wing, or other aircraft structures that utilize spars, to shim gaps between skin panels and the spars.

Based on the forgoing discussion, it therefore remains desirable to improve the fabrication process for aircraft, and in particular, to improve processes for assembling aircraft structures that include spars.

SUMMARY

Composite assemblies are described that include composite spars that are co-cured with one or more sacrificial members on their flanges, forming an integrated sacrificial surface for the composite spars. Generally, a spar is an elongated structure that includes a web defining a major surface of the spar and flanges that project from sides of the web. Spars run spanwise in a wing, at right angles or nearly right angles to the fuselage, and form the main structural components of a wing. The web in the spar is vertically disposed in the wing, and the flanges define surfaces for attachment of the skin panels. During assembly, gaps may exist between the flanges and the skin panels. In the embodiments described herein, a sacrificial member co-cured with a flange is machined to bring the outer surface of the sacrificial member into conformance with surfaces of the skin panel(s), thereby providing a technical benefit of mitigating gaps between spars and skin panels in the wing or other aircraft structures that utilize spars.

One embodiment comprises a composite assembly. The composite assembly includes a composite spar having a web and flanges that project from sides of the web. The composite assembly further includes a sacrificial member of composite materials co-cured with the composite spar on an outer surface of at least one of the flanges. In addition, the sacrificial member has an outer surface that has been machined into conformance with an inner surface of at least one skin panel for an aircraft structure to form a contact surface with the at least one skin panel.

Another embodiment comprises a method of fabricating a composite assembly. The method comprises assembling a first composite layup that defines a web portion and flange portions for a composite spar of the composite assembly, assembling a second composite layup onto at least one of the flange portions to define a sacrificial member for the composite assembly, and co-curing the first composite layup and the second composite layup to harden the composite assembly. The method further comprises machining an outer surface of the sacrificial member into conformance with an inner surface of at least one skin panel for an aircraft structure to form a contact surface for the at least one skin panel.

Another embodiment comprises a method of fabricating a composite assembly. The method comprises performing a first composite layup onto a layup mandrel that defines a contour for a composite spar of the composite assembly, performing a second composite layup onto a flange portion of the first composite layup defined by contour, and co-curing the first composite layup and the second composite layup to harden the composite assembly, wherein the first composite layup forms the composite spar and the second composite layup forms a sacrificial member on a flange on the composite spar. The method further comprises calculating a machining depth for the sacrificial member based on estimated spacing tolerances between the flange of the composite spar and at least one skin panel for an aircraft structure, and machining an outer surface of the sacrificial member along at least a portion of a length of the composite spar based on the machining depth to form a contact surface for the at least one skin panel.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
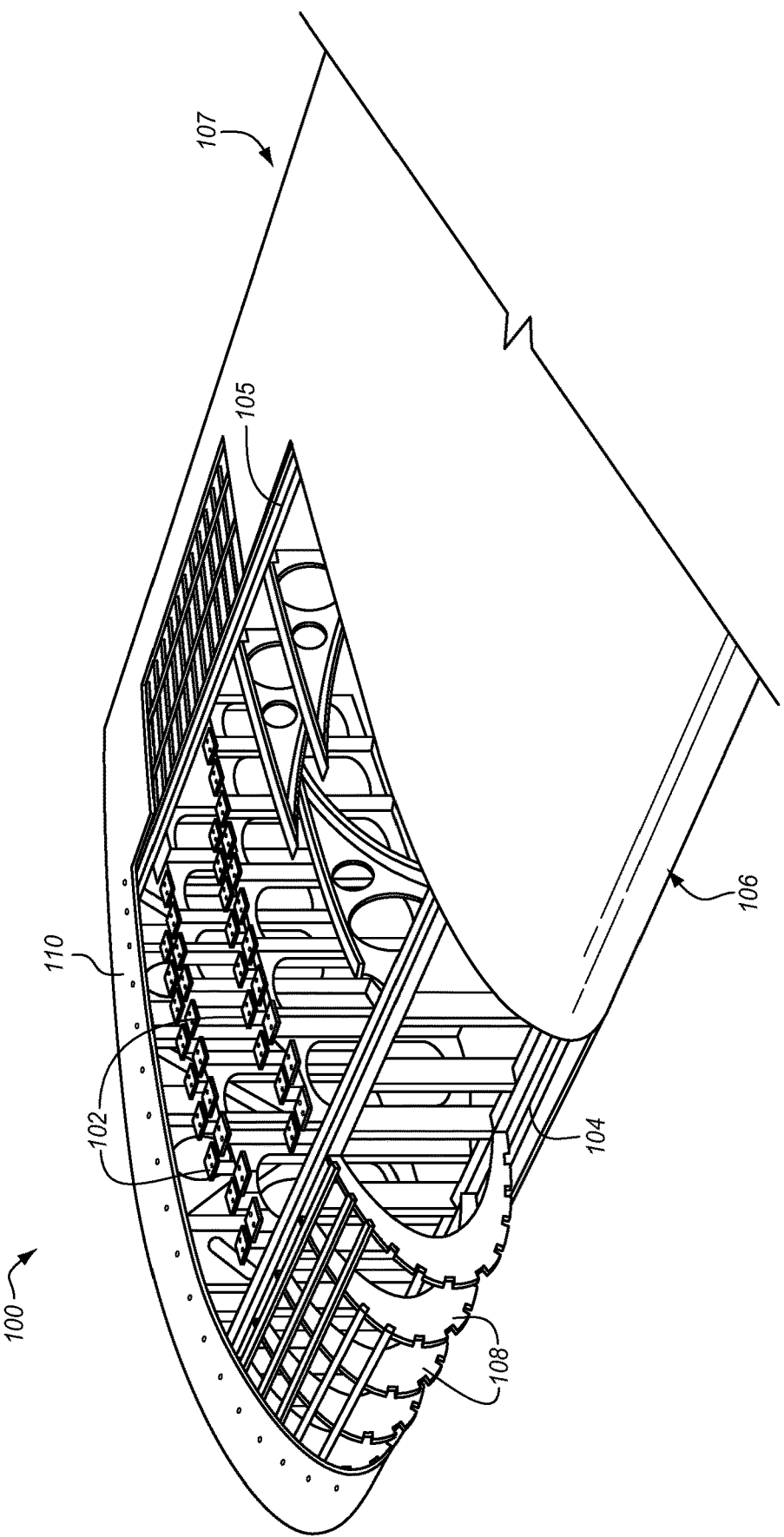
FIG. 1 depicts a wing of an aircraft in the prior art.

FIG. 1 depicts a wing 100 in the prior art. Wing 100 includes a plurality of ribs 102, which extend between a front spar 104 and a rear spar 105, with front spar 104 near a leading edge 106 of wing 100 and rear spar 105 towards a trailing edge 107 of wing 100. In FIG. 1, ribs 102 are spaced apart along a length of wing 100, and their perimeters form a shape of an airfoil for wing 100. In FIG. 1, wing 100 includes nose ribs 108, which extend from front spar 104 towards leading edge 106 of wing 100 to form the front shape of the airfoil at leading edge 106. Wing 100 also includes an outer skin 110, which is partially removed in this view in order to show the underlying structure of wing 100.

As evident in FIG. 1, ribs 102 and spars 104-105 form the skeleton of wing 100, with outer skin 110 adopting the shape of ribs 102 along their peripheral surfaces between spars 104-105.

Figure 2:
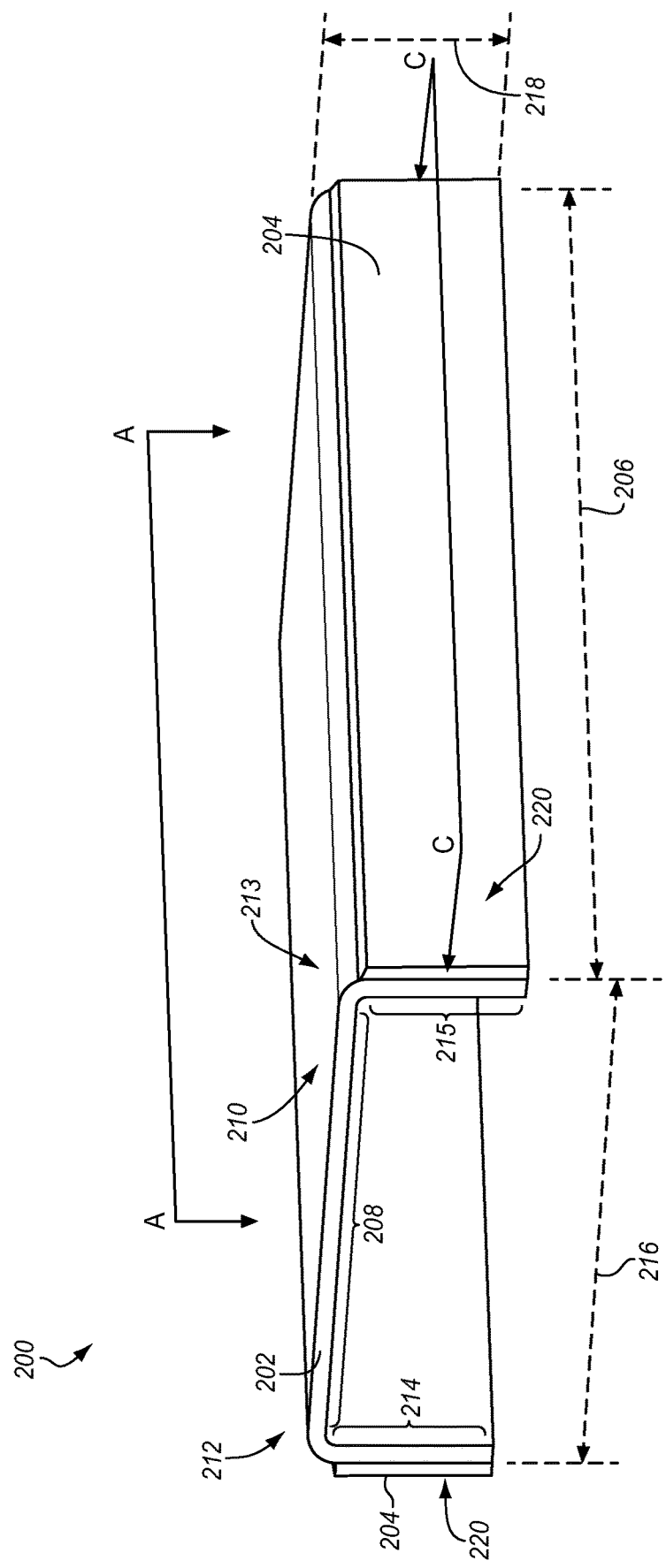
FIG. 2 is an isometric view of a composite assembly in an illustrative embodiment.

FIG. 2 is an isometric view of a composite assembly 200 in an illustrative embodiment. In this embodiment, composite assembly 200 includes a composite spar 202 and one or more sacrificial members 204 of composite materials that are co-cured to form a structural component for an aircraft, such as a wing of an aircraft, an empennage for an aircraft, a tail of an aircraft, etc.

Composite parts, such as Carbon Fiber Reinforced Polymer (CFRP) parts and/or Glass Fiber Reinforced Polymer (GFRP) parts, are initially laid-up in multiple layers of material, which may be referred to as reinforcement layers. Individual fibers within each layer are aligned parallel with each other, but different layers exhibit different fiber orientations in order to increase the strength of the resulting composite part along different dimensions. The layers may be pre-impregnated with a matrix material, such as an uncured thermoset resin or a thermoplastic resin, which is referred to as a "prepreg." Alternatively, the layers may be laid up dry (i.e., "dry fiber"), and are subsequently infused with a matrix material prior to curing.

Referring again to FIG. 2, composite spar 202 in this embodiment is an elongated member extending along a length 206 generally in the shape of an inverted "U". Composite spar 202 includes a web 208 that is substantially flat and defines a major surface 210 of composite spar 202. In this embodiment, flanges 214-215 project from sides 212-213 of web 208 in a downward direction in FIG. 2, defining a width 216 of composite spar 202 and a height 218 of composite spar 202.

In this embodiment, a sacrificial member 204 is co-cured to flange 214 and/or flange 215. After composite assembly 200 is cured, outer surface 220 of sacrificial member 204 may be machined as desired during a fabrication process to mitigate gaps that may arise between flange 214 and/or flange 215 of composite spar 202 and other aircraft structures, such as skin panels. The use of sacrificial member 204 mitigates the use of manual shims that would typically be introduced when spar flanges are mated to skin panels and gaps exist, thereby providing a technical benefit of reducing the amount of time and effort when assembling various aircraft structures that utilize spars and skin panels.

Generally, it is desirable that sacrificial member 204 has a stiffness that is substantially less than the stiffness of composite spar 202, because removing material from sacrificial member 204 minimizes the changes to the overall stiffness of composite assembly 200. To achieve that type of result, composite spar 202 may, for example be formed from BMS8-276 tape (a CFRP material) using a quasi-isotropic layup, which has a very high stiffness. Sacrificial member 204 may, for example, be formed from BMS8-276 fabric (another CFRP material), which has a moderate stiffness compared to BMS8-276 tape. The BMS8-276 fabric for sacrificial member 204 may use a varying +/−45 degree orientation during layup in order to minimize the stiffness of composite assembly 200 in the spanwise direction. When sacrificial member 204 is formed from GFRP, which has a low stiffness as compared to either BMS8-276 tape or fabric, various types of materials and orientation of those materials may be implemented.

Although sacrificial member 204 is depicted on both flanges 214-215 in this embodiment, sacrificial member 204 may be formed on one of flange 214 or flange 215 in some embodiments.

Figure 3:
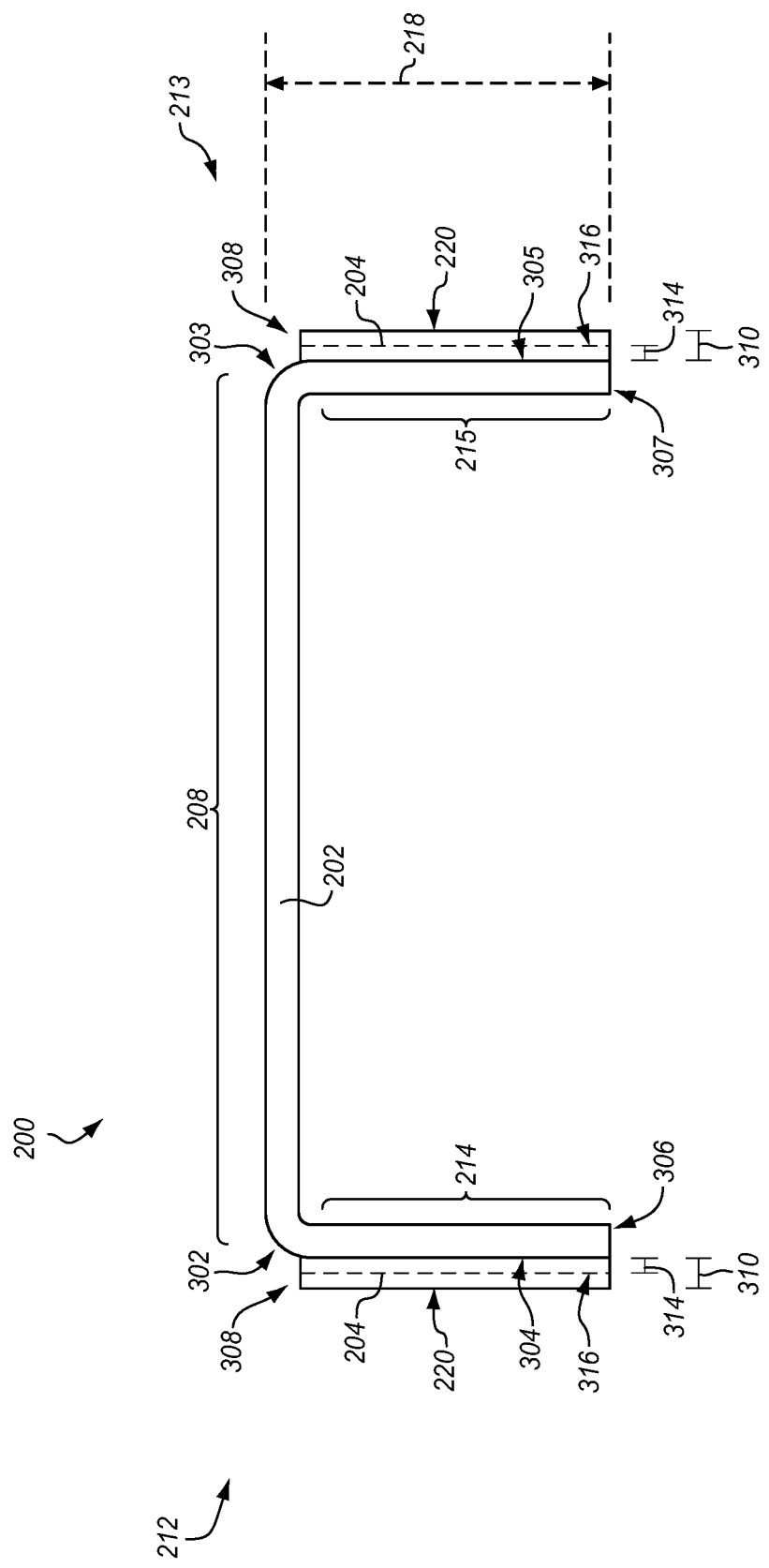
FIG. 3 is a cross-sectional view of the composite assembly along cut lines A-A of FIG. 2 in an illustrative embodiment.

FIG. 3 is a cross-sectional view of composite assembly 200 along cut lines A-A of FIG. 2 in an illustrative embodiment. In this embodiment, composite spar 202 includes a bend 302 between web 208 and flange 214 at side 212 of web 208, and sacrificial member 204 is disposed on outer surface 304 of flange 214. Sacrificial member 204 extends from an end 306 of flange 214 towards bend 302, and terminates at an edge 308 proximate to bend 302. In this embodiment, edge 308 is a square edge, although in other embodiments, edge 308 may have other shapes, such as a taper or ramp. The use of a taper or ramp for edge 308 of sacrificial member 204 may mitigate the generation of compression waves in composite spar 202 during fabrication, which will be discussed later.

Sacrificial member 204 has an initial thickness 310 defined by the distance between outer surface 304 of flange 214 and an outer surface 220 of sacrificial member 204. Typically, initial thickness 310 is pre-selected based on the expected tolerances between flange 214 and other components on the aircraft, such as skin panels. After co-curing composite assembly 200, outer surface 220 of sacrificial member 204 may be machined down (e.g., material is removed from outer surface 220 of sacrificial member 204 along length 206 or portions of length 206 of composite spar 202 (see FIG. 2)), which reduces initial thickness 310 of sacrificial member 204 to a final thickness 314 based on a machining profile or machining depth. Machining sacrificial member 204 also generates a contact surface 316 for the skin panels. Although layers are not shown in FIG. 3, both composite spar 202 and sacrificial member 204 are formed from composite materials, such as CFRP plies.

In a similar manner to flange 214, composite spar 202 includes a bend 303 between web 208 and flange 215 at side 213 of web 208, and sacrificial member 204 is disposed on an outer surface 305 of flange 215. Sacrificial member 204 in this embodiment extends from an end 307 of flange 215 towards bend 303, and terminates at edge 308 proximate to bend 303. In this embodiment, edge 308 is a square edge, although in other embodiments, edge 308 may have other shapes, such as a taper or ramp, for reasons similar to edge 308 of sacrificial member 204 on flange 214. Sacrificial member 204 on flange 215 has an initial thickness 310 defined by the distance between outer surface 305 of flange 215 and an outer surface 220 of sacrificial member 204, which may be the same or different than initial thickness 310 of sacrificial member 204 on flange 214. Typically, initial thickness 310 is selected based on the expected tolerances between flange 215 and other components on the aircraft, such as skin panels, and then outer surface 220 of sacrificial member 204 may be machined down (e.g., material is removed from outer surface 220 of sacrificial member 204 at flange 215 along length 206 of composite spar 202 (see FIG. 2)), which reduces initial thickness 310 of sacrificial member 204 to a final thickness 314 based on a machining profile. In addition, the amount of material removed from sacrificial member 204 may vary along length 206 or a portion of length 206 of composite spar 202 and/or may vary depending upon which of flanges 214-215 that sacrificial member 204 is located.

Figure 4:
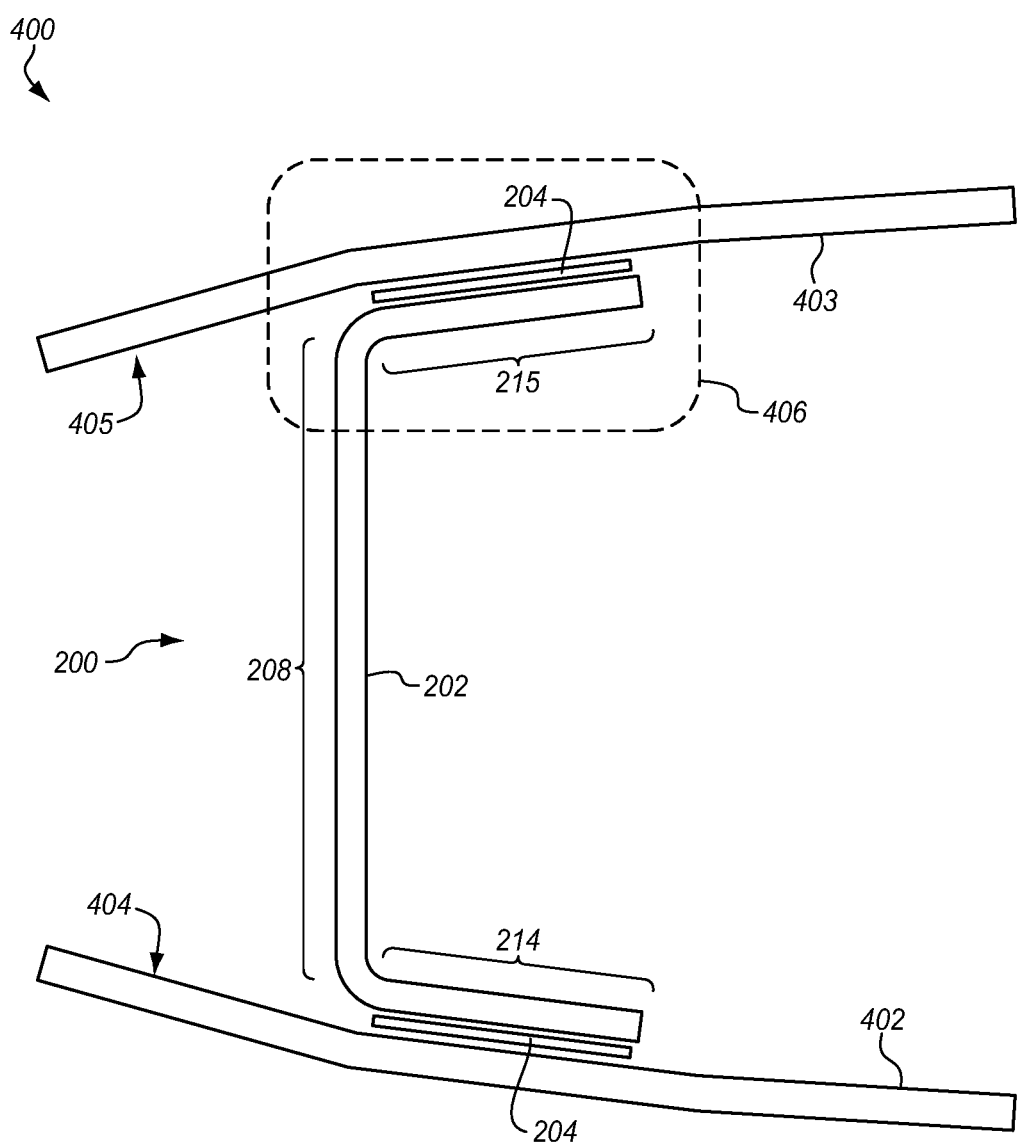
FIG. 4 depicts a portion of an aircraft structure in an illustrative embodiment.

FIG. 4 depicts a portion of an aircraft structure 400 in an illustrative embodiment. In this embodiment, aircraft structure 400 includes composite assembly 200 and skin panels 402-403. Sacrificial member 204 for flange 214 is located proximate to an inner surface 404 of skin panel 402 in this embodiment, and sacrificial member 204 of flange 215 is located proximate to an inner surface 405 of skin panel 403 in this embodiment.

As discussed previously, shims were often manually installed between spar flanges and skin panels during an assembly process in order to compensate or mitigate gaps that formed between these two components. Generally, it is undesirable to machine directly on composite spar 202, because the machining process removes fiber layers and may compromise the structural integrity of composite spar 202. While the use of shims precludes machining directly on spars, the use of shims is a time-consuming process that includes temporarily assembling the components together, measuring any gaps that may exists between spar flanges and their skin panels, disassembling the components, and bonding shims to the spar flanges. The shims may then be machined to achieve the final fit between the spar flanges and the skin panels. A final assembly of the spars and skin panels may then be performed.

With sacrificial member 204 co-cured to flange 214 and/or flange 215 of composite spar 202, a machining process can be performed on outer surface 220 of sacrificial member 204 prior to assembling aircraft structure 400, which saves time and effort over the prior manual shim process. For example, the machining profile or machining depth for sacrificial member 204 may be generated based on a number of different factors, including an expected tolerance between flanges 214-215 of composite spar 202 and inner surfaces 404-405 of skin panels 402-403. Once a machining profile or machining depth is selected and composite assembly 200 is tested for fit with respect to skin panels 402-403, subsequent spars with integrated sacrificial members may be machined to the same profile or depth, ensuring that each spar is interchangeable between different builds of the same aircraft structure. If gaps are found between skin panels 402-403 and their corresponding sacrificial members 204 after machining and during assembly, the machining profile or machining depth can be adjusted for subsequent fabrications of composite assembly 200 to mitigate the gaps in future builds of aircraft structure 400.

In another example, a 3-Dimensional (3D) scan may be performed on composite assembly 200 and skin panels 402-403, which may then be used to determine the machining profile to apply to sacrificial member(s) 204. In this case, composite assembly 200 and skin panels 402-403 may be serialized or marked for use as a group, which makes it less likely that composite assembly 200 is interchangeable between different build instances of the same aircraft structure 400. Both of these different types of profile generating processes will be discussed in more detail later.

Figure 5:
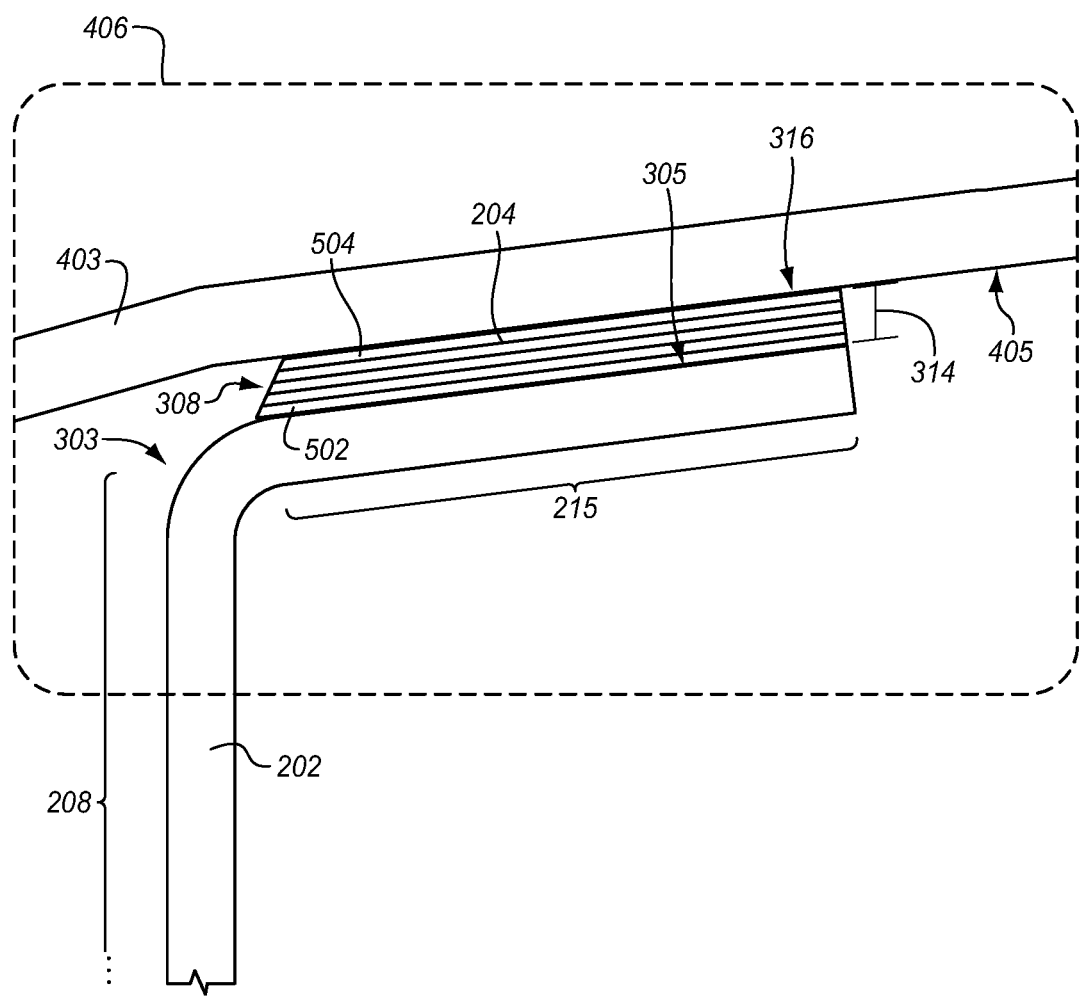
FIG. 5 is a view of a region in FIG. 4 in an illustrative embodiment.

FIG. 5 is a view of region 406 of FIG. 4 in an illustrative embodiment. In this embodiment, edge 308 of sacrificial member 204 is in the shape of a ramp or taper, which is proximate to bend 303 in composite spar 202. The use of a taper or ramp for edge 308 may be used to mitigate the deformation in composite spar 202 that may be generated during the fabrication process due to vacuum compression during cure, which may generate waves in the fiber layers that make up composite spar 202. Edge 308 may be cut into a ramp after layup or laid-up as a ramp during fabrication. When edge 308 is laid-up as ramp, layers may decrease in width as the distance from outer surface 305 of flange 215 increases (e.g., by having layer 502, which is proximate to outer surface 305 of flange 215, wider than layer 504, which is distal to outer surface 305 of flange 215). FIG. 5 also illustrates bonding surface 316 in contact with inner surface 405 of skin panel 403, with contact surface 316 generated after machining outer surface 220 (see FIG. 3) of sacrificial member 204 until final thickness 314 is achieved.

Figure 6:
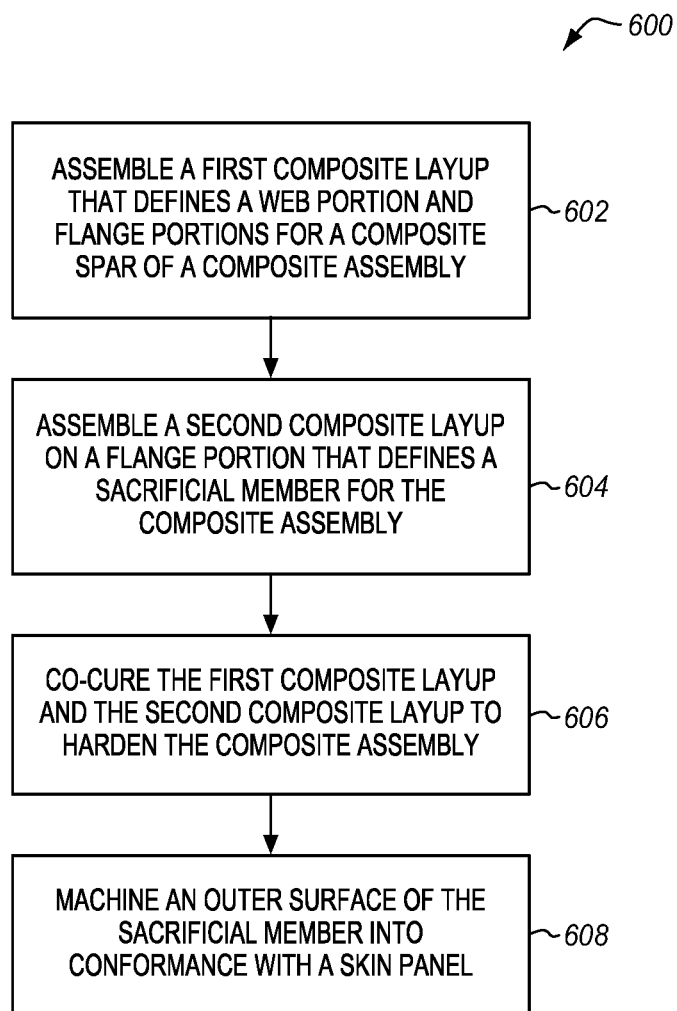
FIG. 6 is a method of fabricating a composite structure in an illustrative embodiment.
Figure 7:
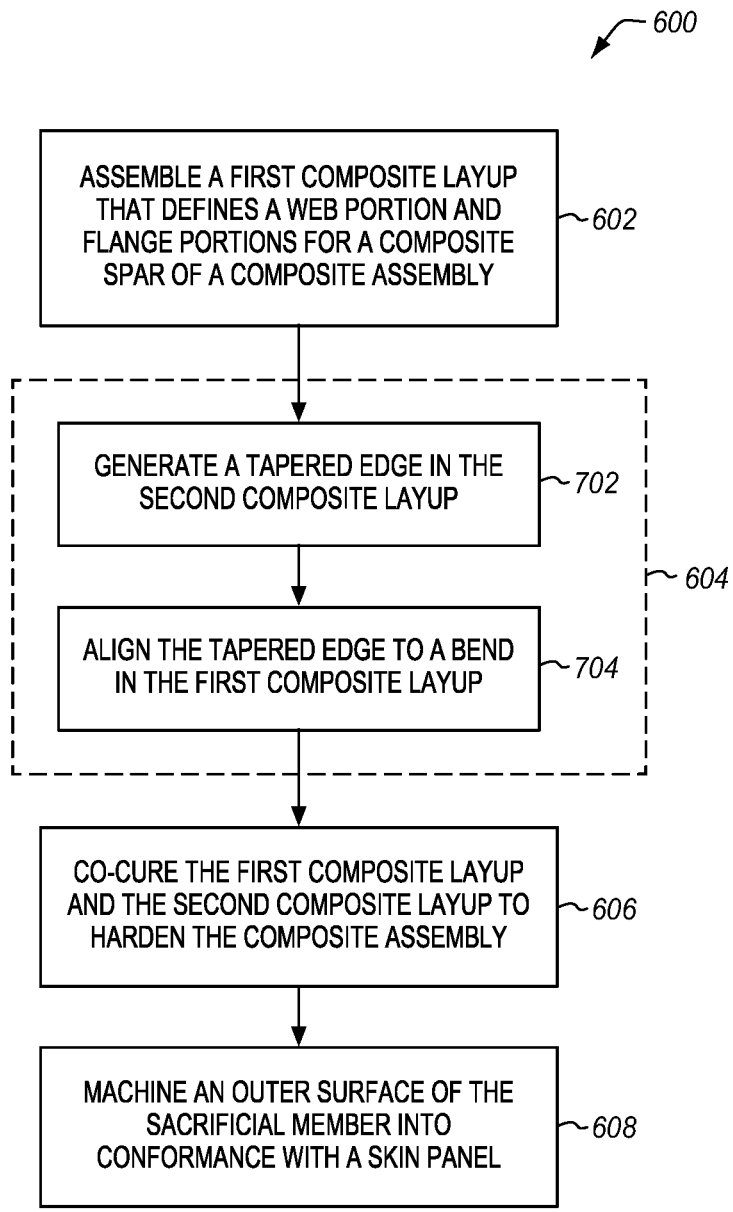
FIGS. 7-12 depict additional details of the method of FIG. 6 in illustrative embodiments.
Figure 8:
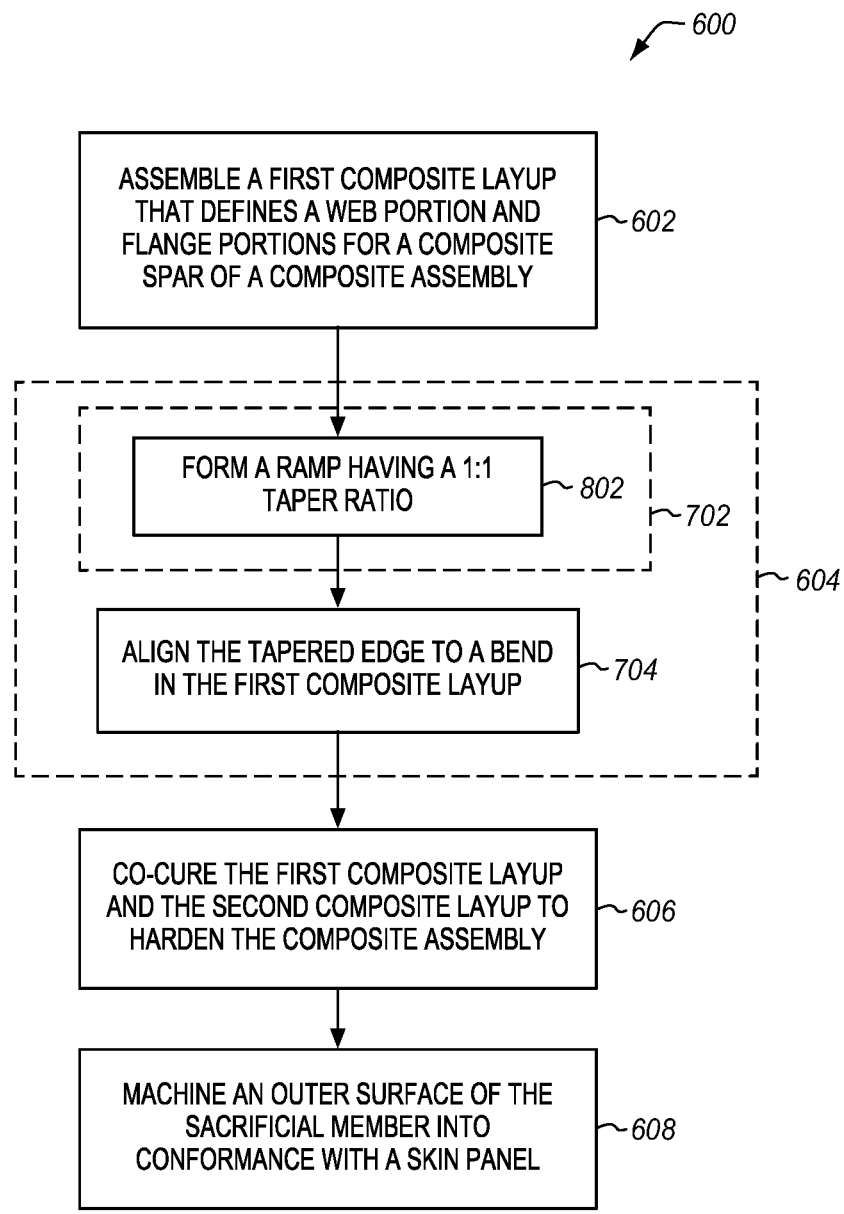

FIG. 6 is a method 600 of fabricating a composite structure in an illustrative embodiment, FIGS. 7-12 depict additional details of method 600 in illustrative embodiments, and FIGS. 13-22 are isometric views of various stages in the fabrication process in illustrative embodiments. The methods described herein will be discussed with regard to various embodiments of composite assembly 200 and aircraft structure 400, although the methods may apply to other configurations of composite assembly 200 and aircraft structure 400, not shown or described. The steps of the methods described herein may include other steps, not shown. Also, the steps may be performed in an alternate order.

Step 602 comprises assembling a first composite layup that defines portions of composite spar 202. In one example, the first composite layup may be formed flat, and shaped over a layup mandrel 1302 that defines a contour for composite spar 202 (see FIG. 13). Layup mandrel 1302 includes a flat region 1304 that defines the shape of web 208 for composite spar 202, a first side region 1306 that defines the shape and orientation of flange 214 relative to web 208 for composite spar 202, and a second side region 1308 that defines the shape and orientation of flange 215 relative to web 208 of composite spar 202.

Figure 14:
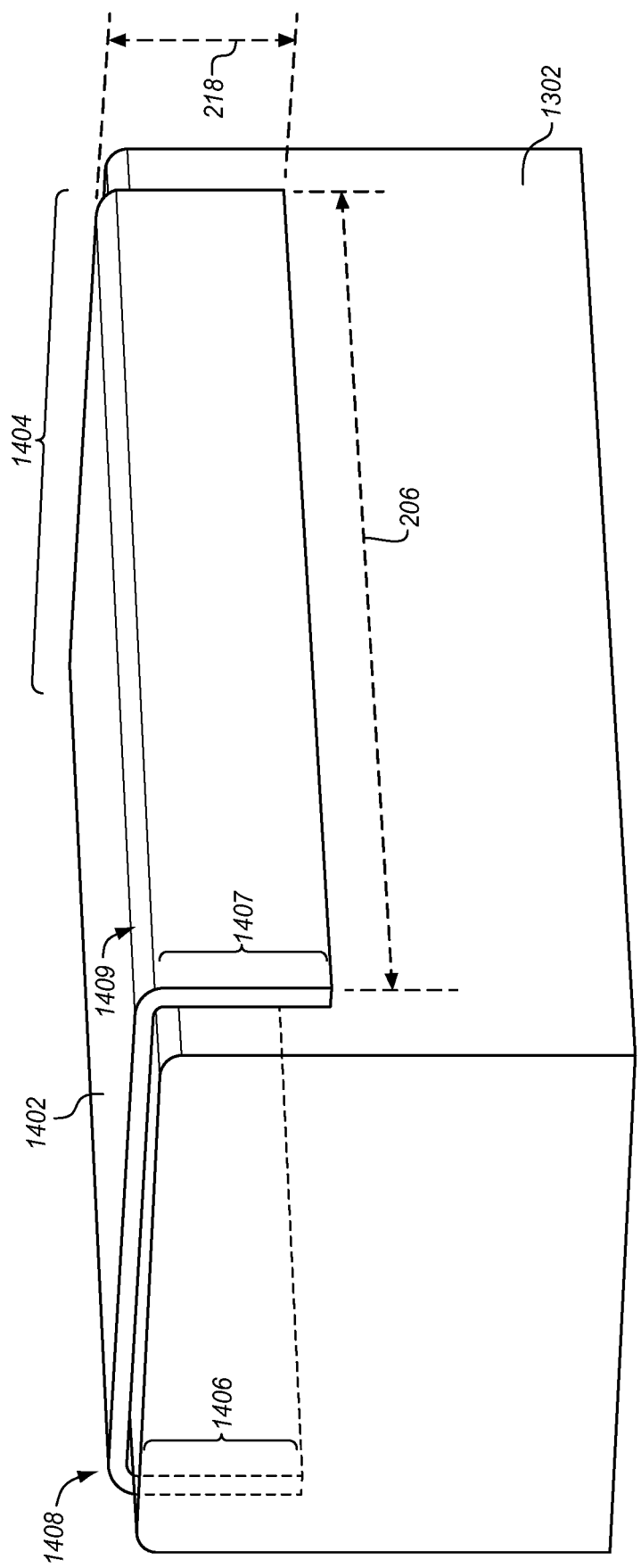

In another example of assembling the first composite layup, an Automated Fiber Placement (AFP) machine may perform a layup directly on layup mandrel 1302. FIG. 14 depicts first composite layup 1402 on layup mandrel 1302, which defines a web portion 1404, flange portions 1406-1407, and bends 1408-1409 for composite spar 202 defined by the underlying shape or contour of layup mandrel 1302. Generally, first composite layup 1402 comprises continuous fiber layers that may vary in orientation from one layer to the next, formed as a prepreg or a dry layup. Further, the layers may continue from end 306 of flange 214 to end 307 of flange 215. As discussed previously, first composite layup 1402 may comprise BMS8-276 tape with a quasi-isotropic layup, which has a very high stiffness after curing.

Step 604 comprises assembling a second composite layup 1502 (see FIG. 15) onto flange portion 1406 and/or flange portion 1407 of first composite layup 1402. For example, a flat layup may be performed for second composite layup 1502, and transferred to, and directly contacting, flange portion 1406 and/or flange portion 1407 of first composite layup 1402. In another example, an AFP machine may perform a layup directly on flange portion 1406 and/or flange portion 1407 of first composite layer 1402. As discussed previously, second composite layup 1502 may comprise BMS8-276 fabric layered in a varying +/−45-degree orientation, which has moderate stiffness after curing as compared to BMS8-276 tape, or a GFRP material, which has a low stiffness after curing as compared to both BMS8-276 tape or BMS8-276 fabric.

Step 606 comprises co-curing first composite layup 1402 and second composite layup 1502 to harden composite assembly 200. For example, first composite layup 1402 and second composite layup 1502 may be bagged, placed under vacuum to apply pressure to first composite layup 1402 and second composite layup 1502, and heated in order to harden composite assembly 200. The resulting structure after cure is composite assembly 200 as illustrated in FIG. 2, with composite spar 202 having web 208 formed from web portion 1404, and flanges 214-215 formed from flange portions 1406-1407, respectively, of the first composite layup 1402, and with sacrificial member 204 formed from second composite layup 1502 on one or both of flanges 214-215.

Step 608 comprises machining outer surface 220 of sacrificial member 204 into conformance with surfaces of one or more skin panels. For example, machining outer surface 220 of sacrificial member 204 is performed to remove material from sacrificial member 204 and form contact surface 316 for skin panel 402 and/or skin panel 403. Prior to the machining process, initial thickness 310 of sacrificial member 204 may be between about 0.08 inches and 0.12 inches. After the machining process, final thickness 314 of sacrificial member 204 may be between about 0.03 inches and 0.08 inches.

In some cases, it may be desirable that edge 308 of sacrificial member 204 that is proximate to bend 302 and/or bend 303 in composite spar 202 has a specific shape in order to prevent structural changes in composite spar 202 during the fabrication process for composite assembly 200. In these cases, edges 1504 (see FIG. 15) in second composite layup 1502 may be formed or cut into a shape of a taper or ramp (see step 702 of FIG. 7), and aligned with their respective bends 1408-1409 in first composite layup 1402 (see step 704 of FIG. 7). The use of a taper or ramp shape for edges 1504 of second composite layup 1502 prevents waves in first composite layup 1402 when compression is applied during the cure. The ramp or taper may have a particular ratio, such as 1:1 (see step 802 of FIG. 8), where the ramp or taper generally forms a 45-degree angle as depicted in FIG. 5 after cure. However, other types of shapes for edges 1504 of second composite layup 1502 may be used in other embodiments in order to generate any type of edge 308 that is desired in sacrificial member 204 after cure.

Figure 9:
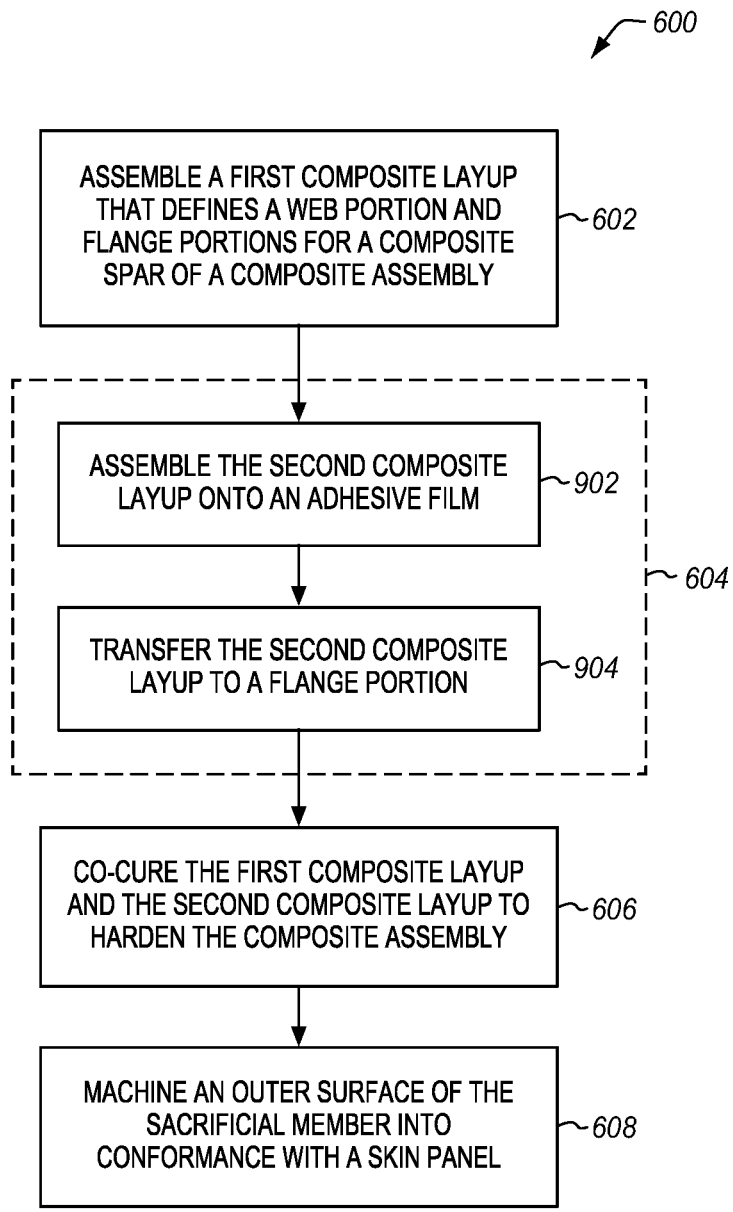
Figure 10:
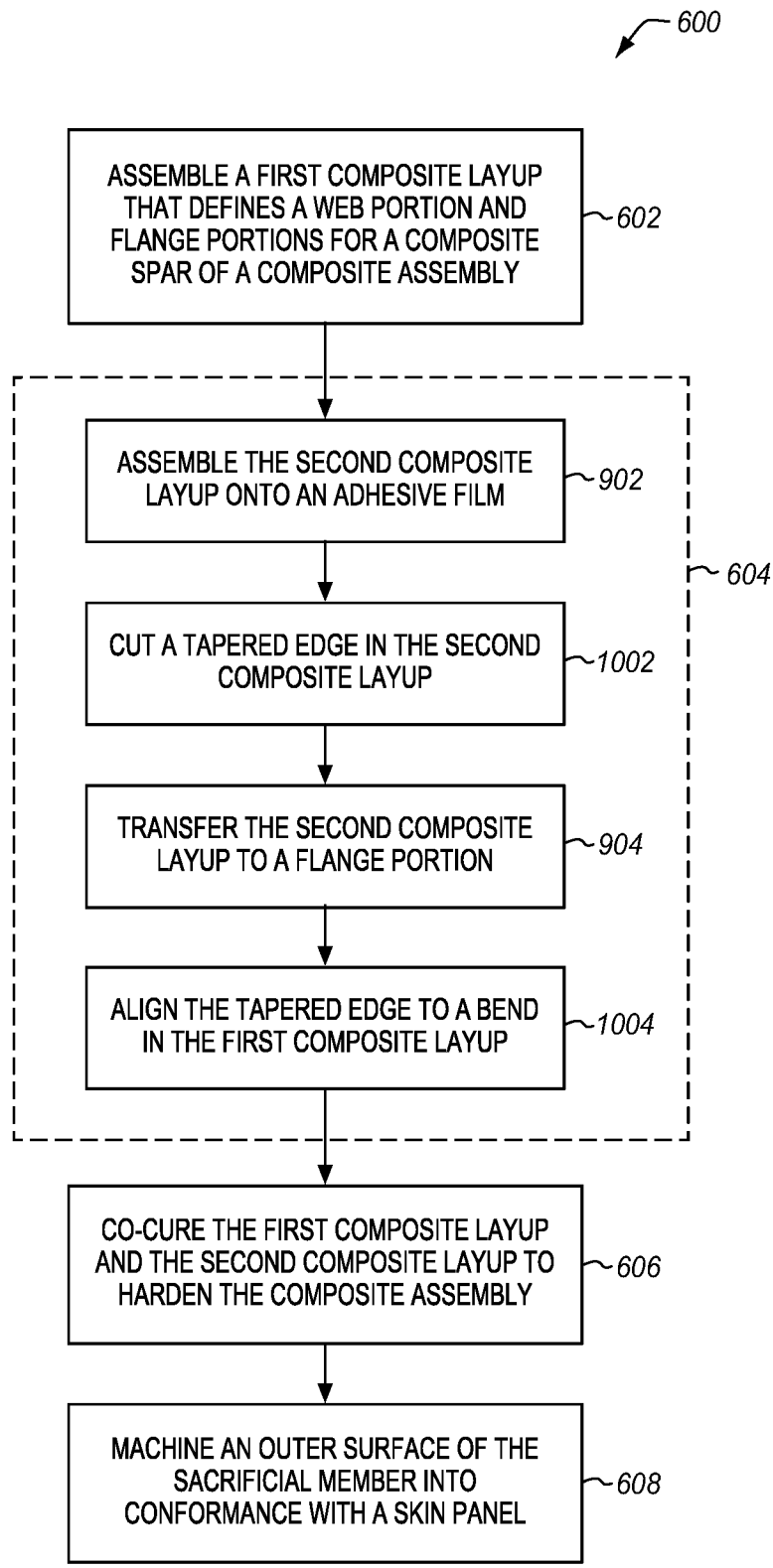
Figure 11:
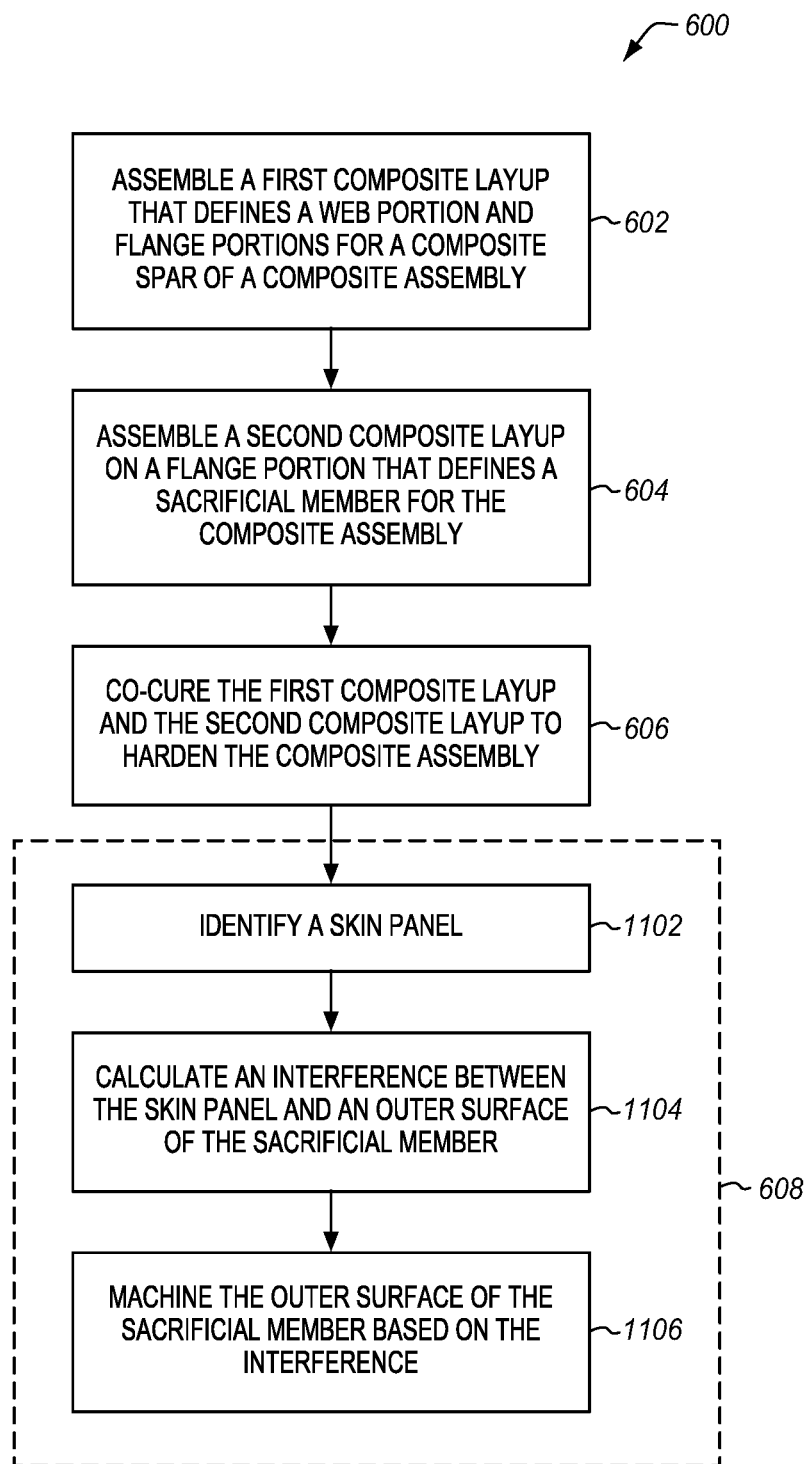
Figure 16:
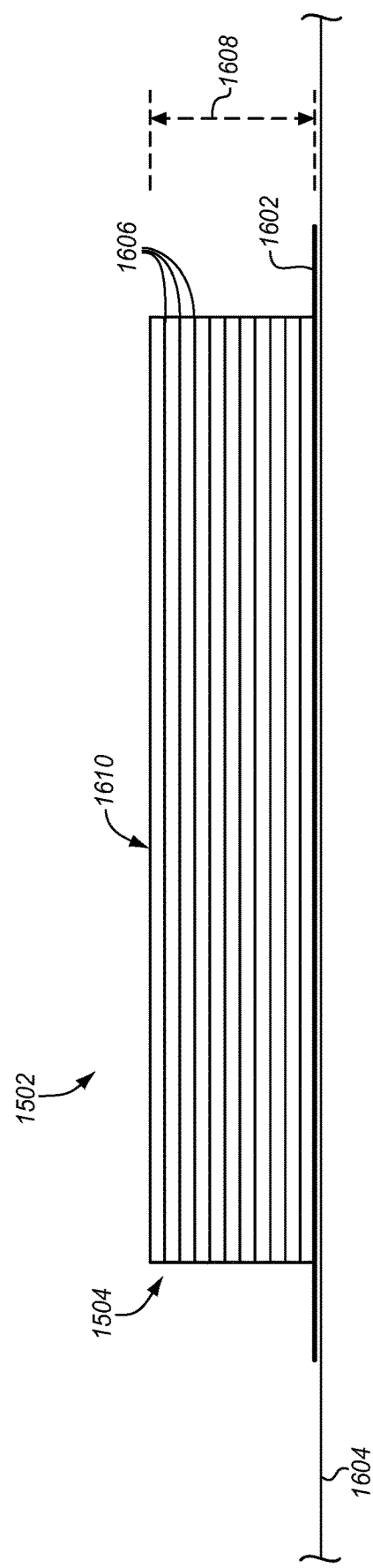

When a hand placement of second composite layup 1502 onto first composite layup 1402 is performed prior to cure, second composite layup 1502 may be assembled onto an adhesive film 1602 placed onto a work surface 1604 as depicted in FIG. 16 (see step 902 of FIG. 9). As depicted in FIG. 16, second composite layup 1502 includes a number of layers 1606 that are stacked vertically to achieve a desired thickness 1608 for second composite layup 1502, which is used to define initial thickness 310 after cure (see FIG. 3). An outer surface 1610 of second composite layup 1502 forms outer surface 220 of sacrificial member 204 after composite assembly 200 is cured.

Figure 17:
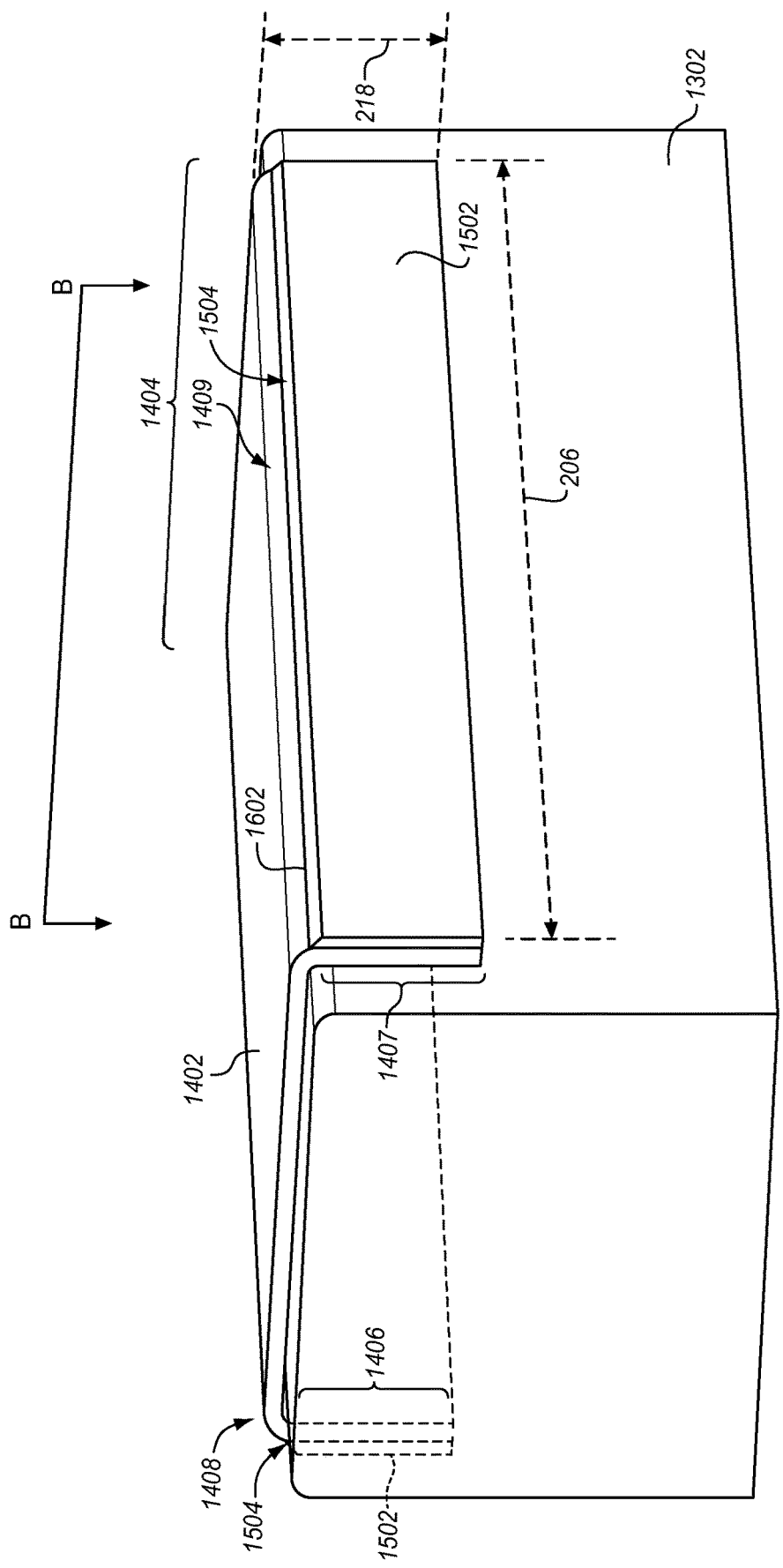
Figure 18:
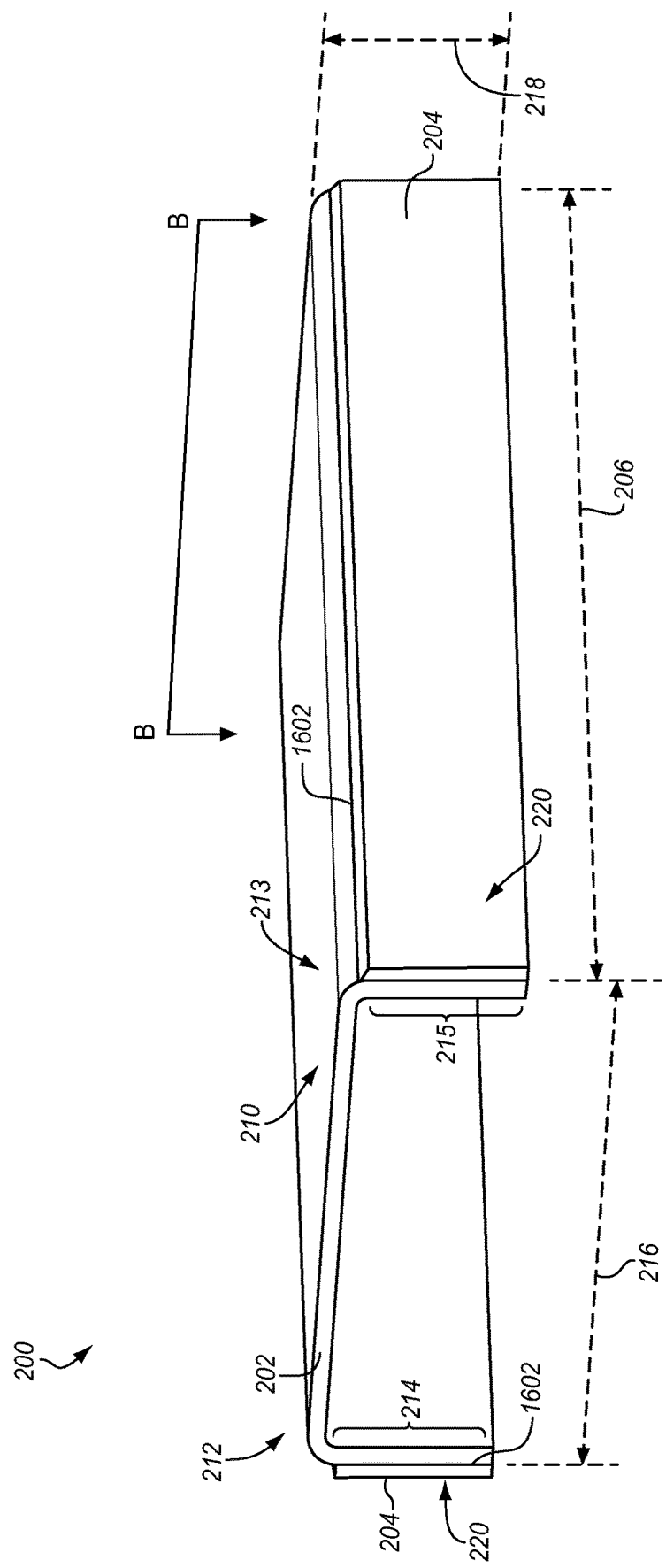
Figure 19:
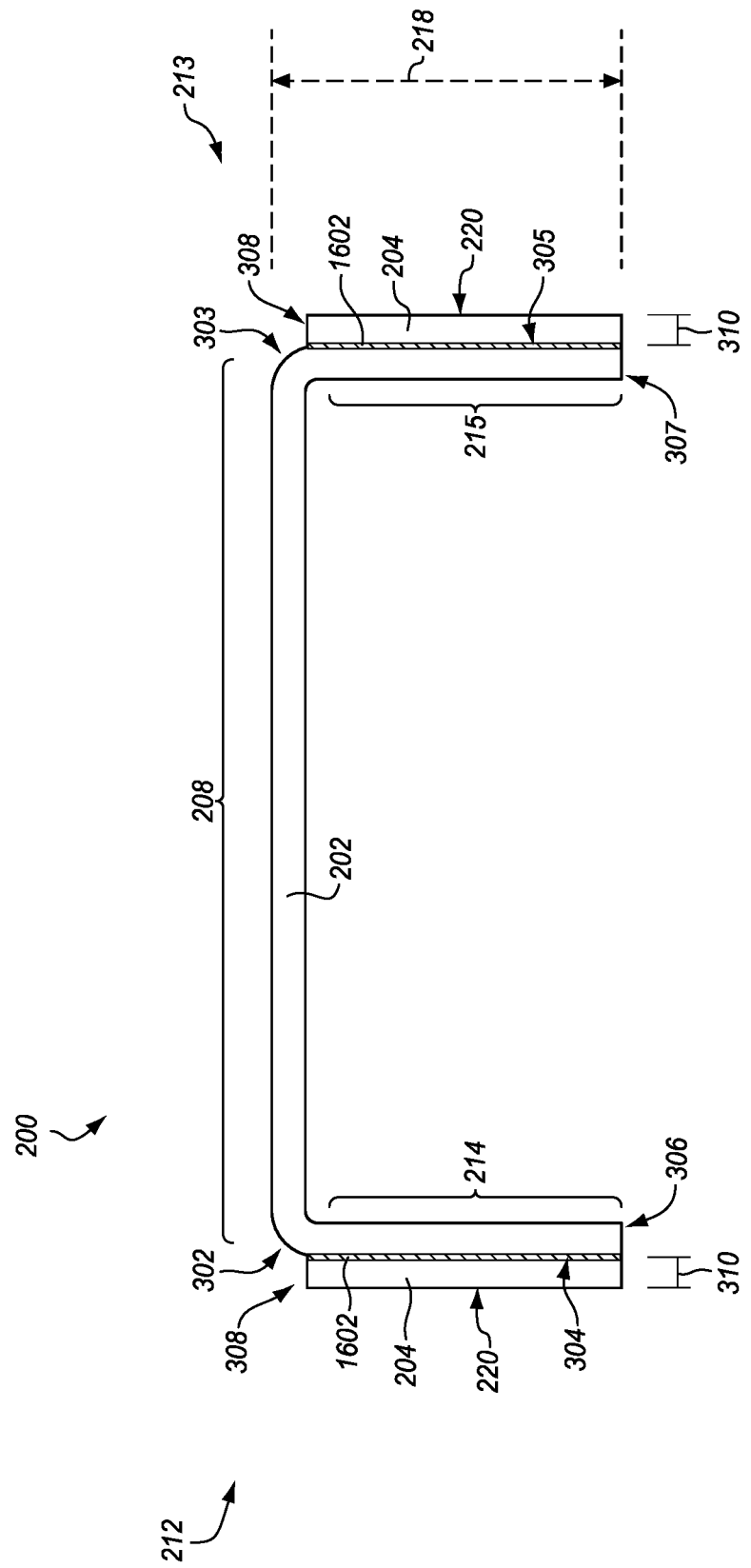
Figure 20:
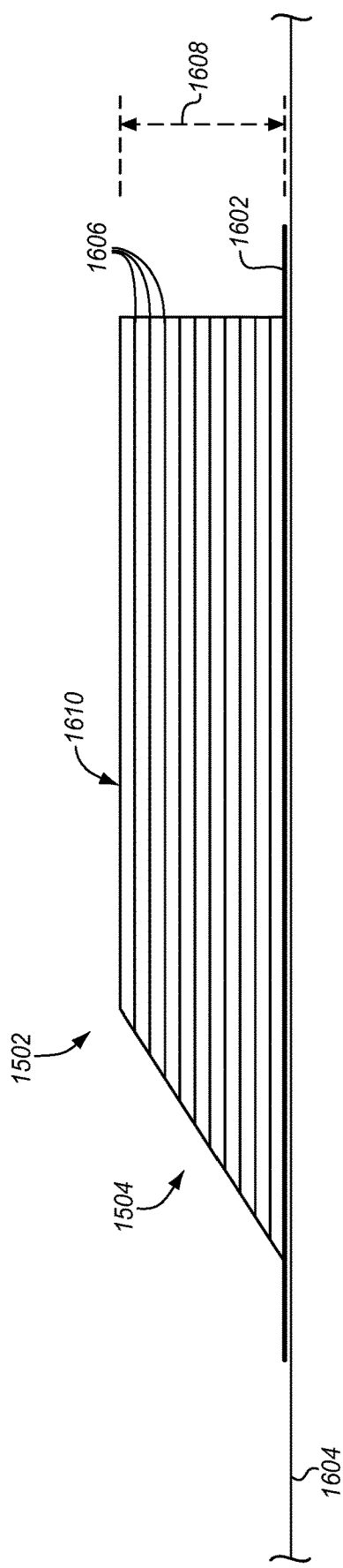
Figure 21:
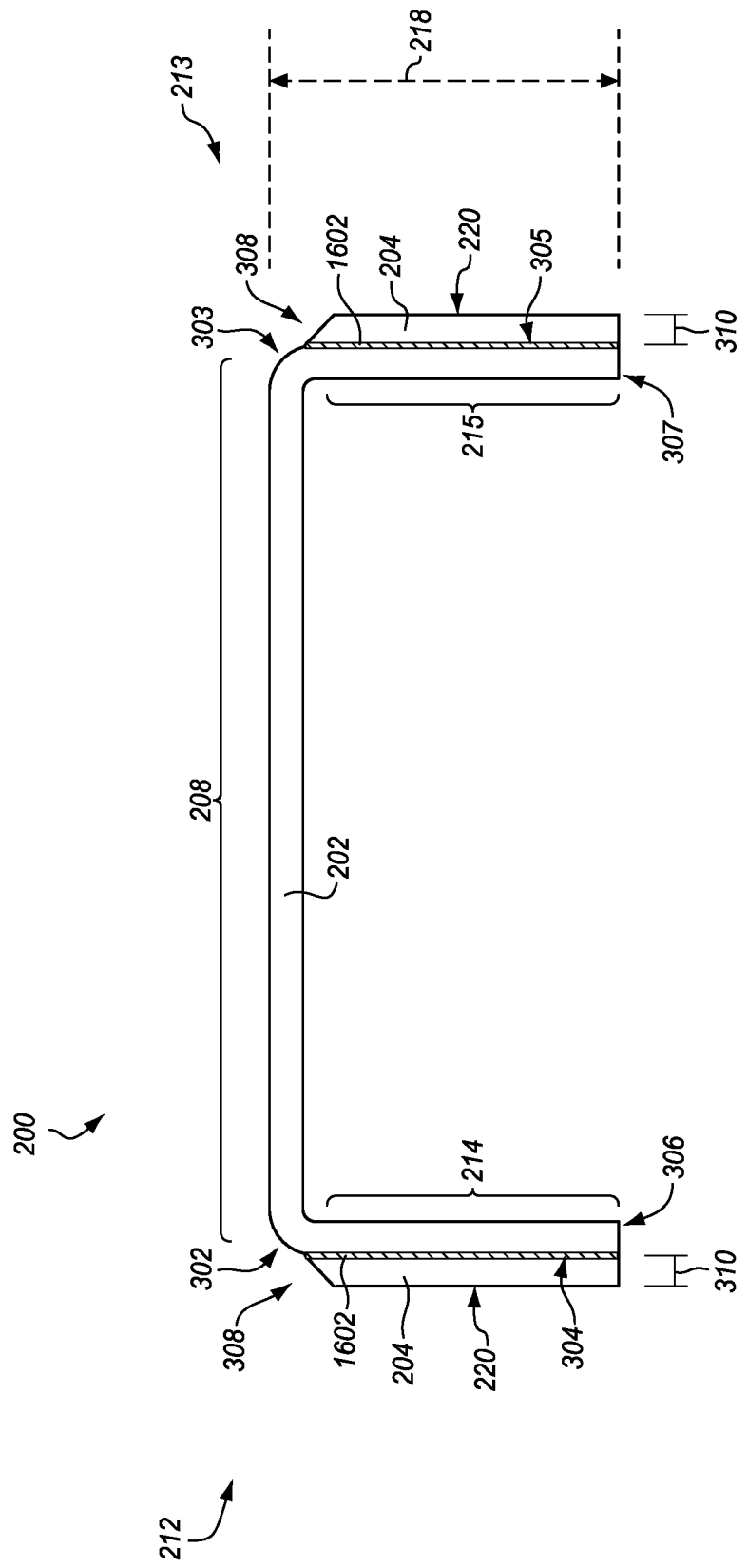

After assembling second composite layup 1502 onto adhesive film 1602, second composite layup 1502 and adhesive film 1602 are transferred to flange portion 1406 and/or flange portion 1407 of first composite layup 1402 during the assembly process (see step 904), as depicted in FIG. 17, with adhesive film 1602 contacting outer surface 304 of flange 214 and/or outer surface 305 of flange 215. Vacuum bagging, compression, and cure may be performed in order to generate composite assembly 200 of FIG. 18, with adhesive film 1602 disposed between sacrificial member 204 and flange 214 and/or flange 215. FIG. 19 depicts a cross-sectional view of FIG. 18 along cut lines B-B, which illustrates the placement of adhesive film 1602 between sacrificial member 204 and flange 214 and/or flange 215.

When edge 308 is tapered in sacrificial member 204, second composite layup 1502 may be assembled on adhesive film 1602 as previously described with respect to FIG. 9 and FIG. 16, and a taper may be cut in edge 1504 of second composite layup 1502 (see step 1002 and FIG. 20), and second composite layup 1502 may then be transferred to flange portion 1406 and/or flange portion 1407 of first composite layup 1402 (see step 904), with edge 1504 aligned to bend 1408 and/or bend 1409 (see step 1004 and FIG. 17). After cure, edge 1504 of second composite layup 1502 forms edge 308 of sacrificial member 204 for composite assembly 200 as depicted in a cross-section of composite assembly 200 in FIG. 21.

Figure 22:
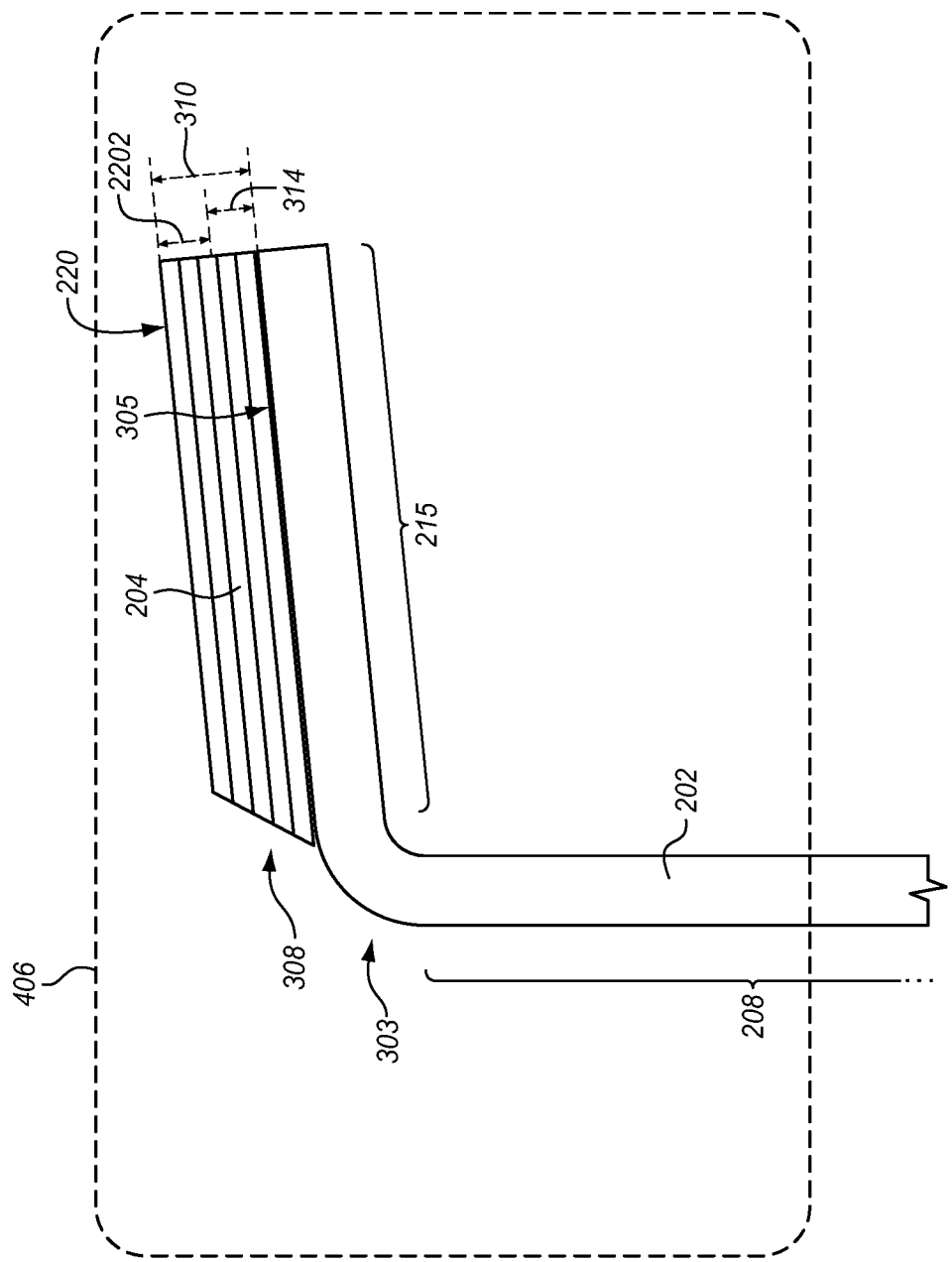

As discussed previously, there are a number of processes that may be used to determine how much material to remove from outer surface 220 of sacrificial member 204 after composite assembly 200 is cured and hardened. One process comprises linking or associating composite assembly 200 with specific skin panels 402-403 in aircraft structure 400 (see FIG. 4). First, one or more skin panels may be identified that are to be bonded or mated to composite spar 202 (see step 1102 of FIG. 11). Depending on the design of the structure that utilizes composite spar 202, multiple skin panels may be bonded or mated to composite spar 202 along its length 206. For example, skin panel 403 may be identified as being assigned for installation at flange 215 of composite spar 202 (see FIG. 5). An interference may be calculated between skin panel 403 and outer surface 220 of sacrificial member 204 (see step 1104). For instance, a 3D scan of skin panel 403 and composite assembly 200 may be performed, and used to calculate the interference. Outer surface 220 of sacrificial member 204 may then be machined based on the interference (see step 1106). For instance, outer surface 220 of sacrificial member 204 may have initial thickness 310 prior to machining as depicted in FIG. 22, which is based on thickness 1608 of second composite layup 1502 prior to cure (see FIG. 16). Outer surface 220 may then be machined down to final thickness 314 as depicted in FIG. 22 prior to assembling composite spar 202 and skin panel 403 together. A machining depth 2202 that cuts into sacrificial member 204 from outer surface 220 towards flange 215 removes material from sacrificial member 204 until a desired final thickness 314 is achieved. Machining depth 2202 may vary along length 206 or portions of length 206 of composite spar 202, even though FIG. 22 merely depicts a cross-section of a particular location in aircraft structure 400 for purposes of discussion. Further, these same processes may be performed on sacrificial member 204 at flange 214, although machining depth 2202 and/or initial thickness 310 may be different between flanges 214-215.

Another process that may be used to determine how much material to remove from sacrificial member 204 after composite assembly 200 is cured and hardened may statically define machining depth 2202 based on the expected tolerances between composite spar 202 and skin panel 402 and/or skin panel 403, and then make adjustments to machining depth 2202 if gaps are found between composite spar 202 and skin panel 402 and/or skin panel 403.

Figure 12:
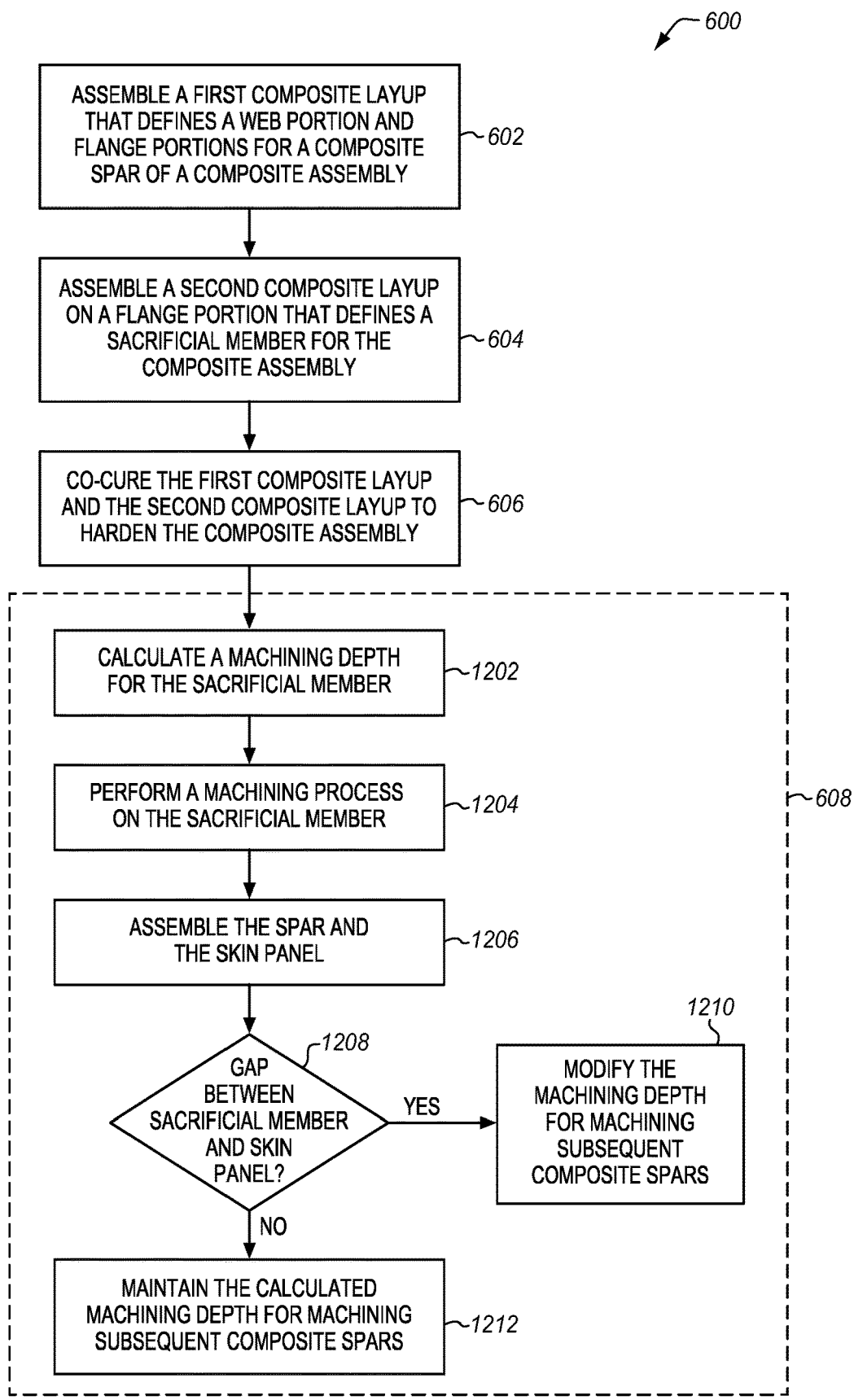
Figure 13:
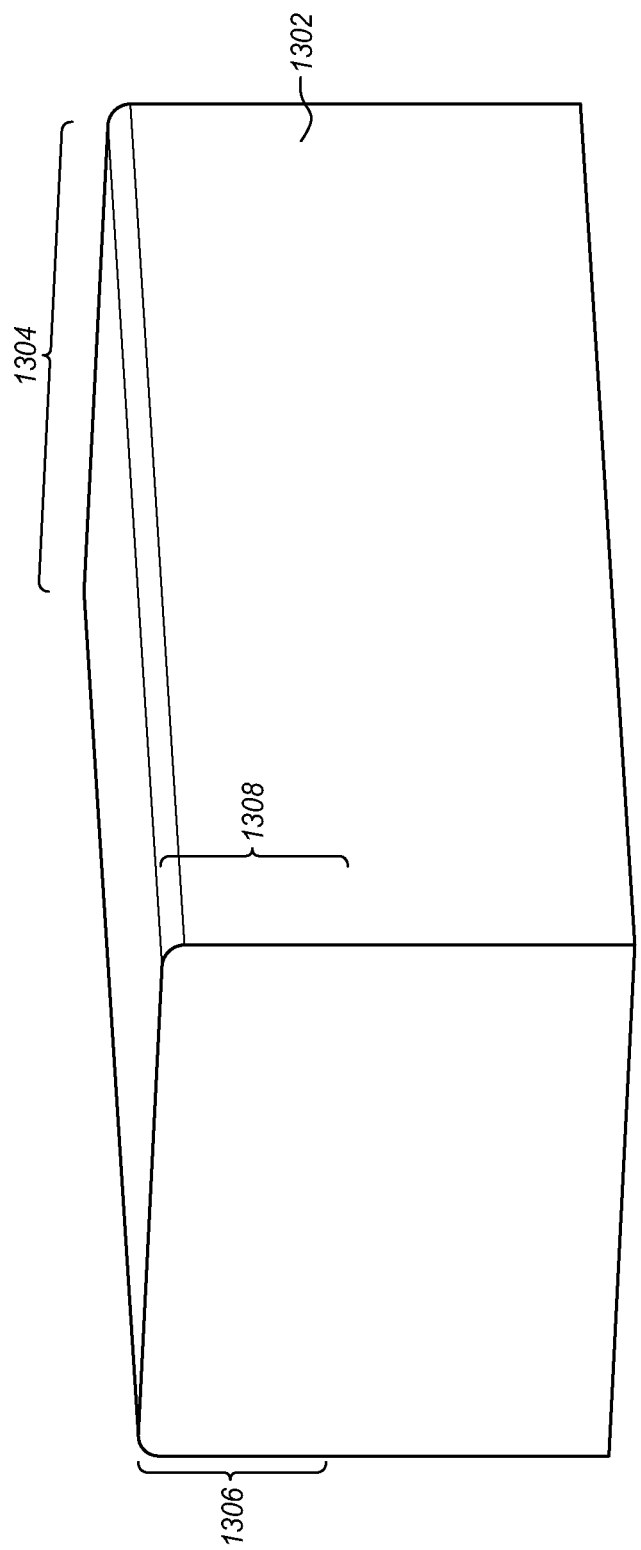
FIGS. 13-24 are isometric views of various stages in the fabrication method of FIG. 6 in illustrative embodiments.

First, a machining depth 2202 may be initially calculated for sacrificial member 204 (see step 1202 of FIG. 12). For example, the components of aircraft structure 400, when fabricated, have manufacturing variations that can be estimated and used to generate a worst-case scenario for gaps between flange 214 and skin panel 402 and/or flange 215 and skin panel 403 for aircraft structure 400, which may be used to initially determine machining depth 2202. FIG. 22 illustrates one example of machining depth 2202 calculated for sacrificial member 204, which indicates how much material will be removed from an outer surface 220 of sacrificial member 204.

Figure 23:
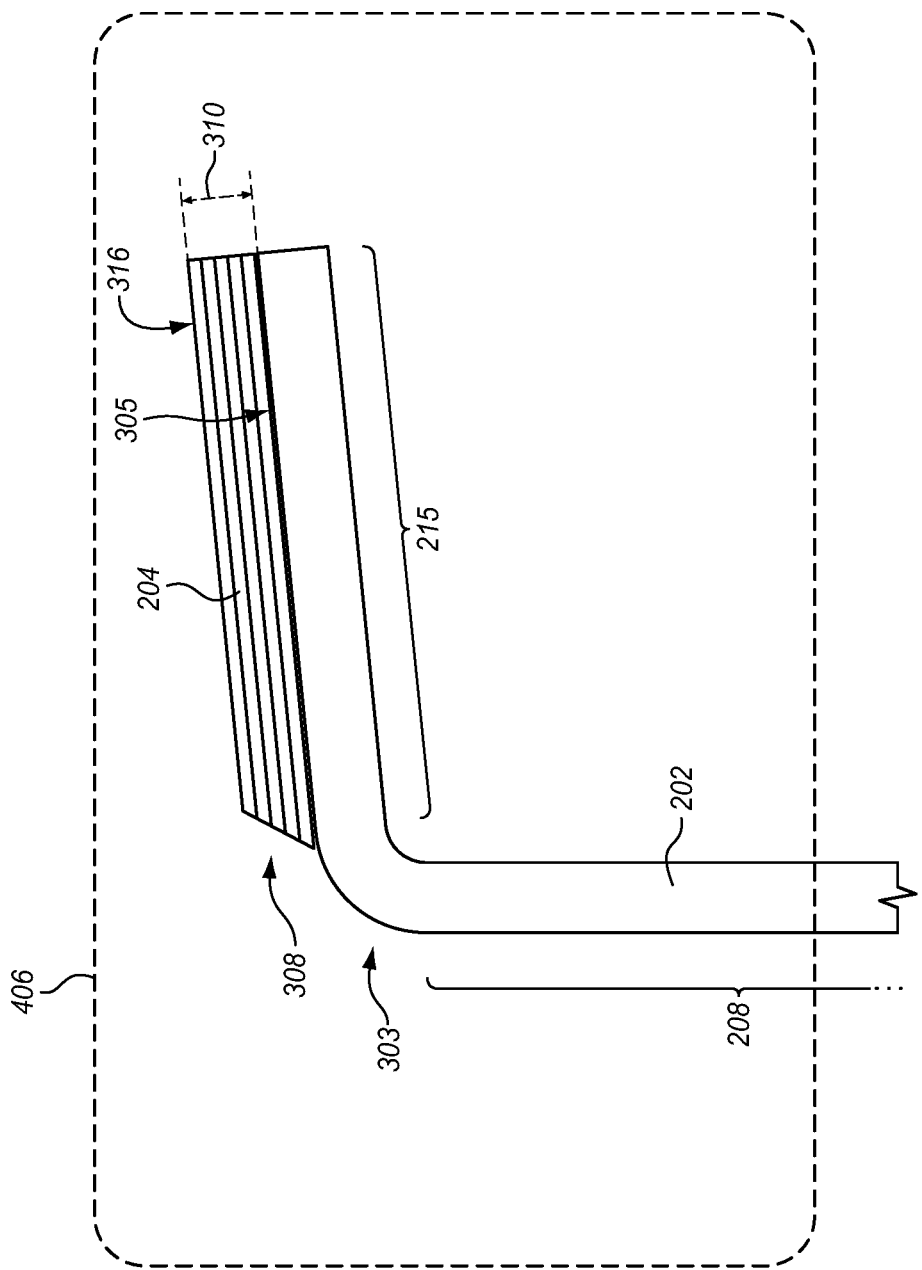
Figure 24:
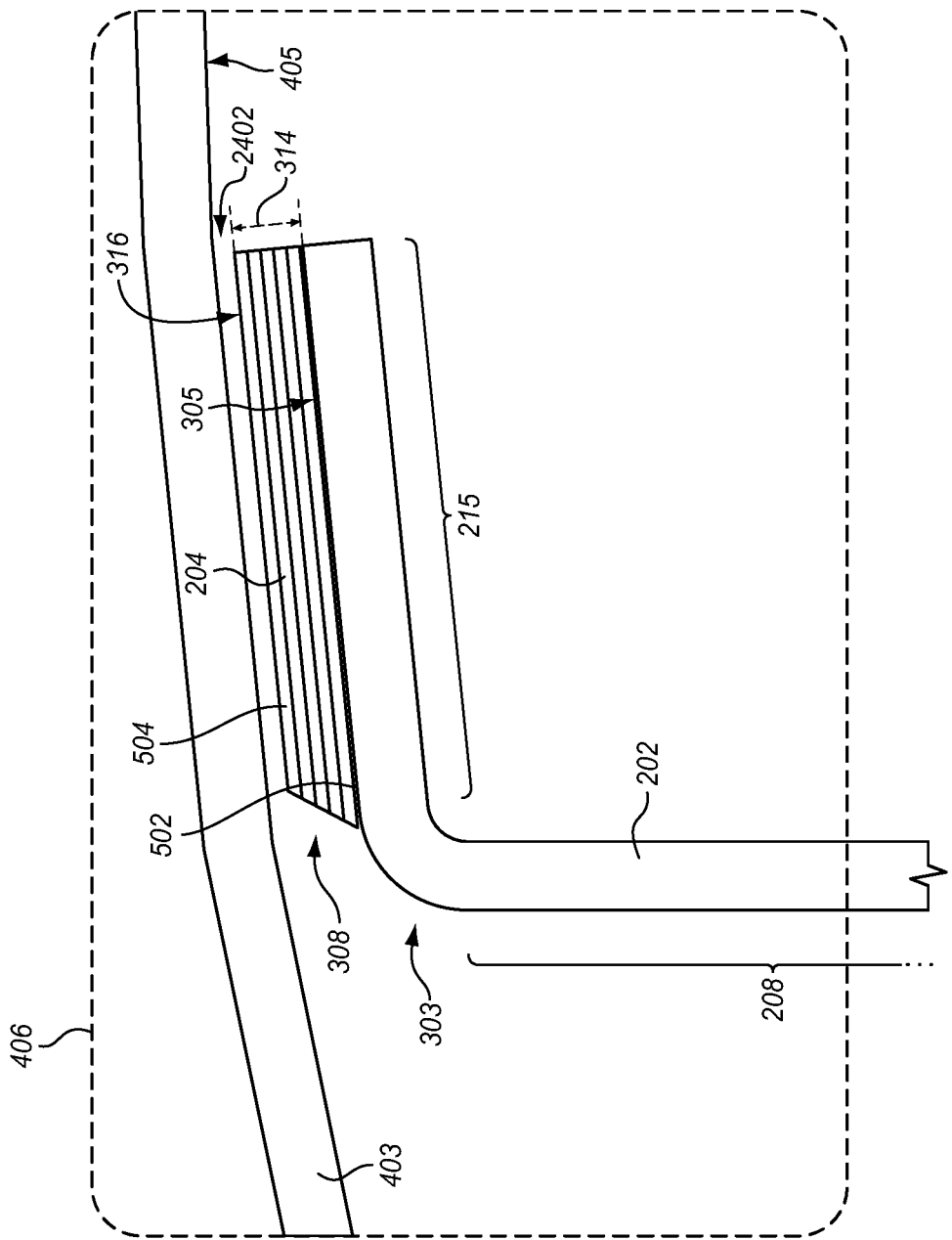

A machining process is performed on outer surface 220 of sacrificial member 204 to remove material to machining depth 2202 (see step 1204), which is depicted in FIG. 23, and composite assembly 200 and skin panel 403 are re-assembled as depicted in FIG. 5 (see step 1206 of FIG. 12). After re-assembly, spacing between contact surface 316 of sacrificial member 204 and inner surface 405 of skin panel 403 are checked to determine if gaps are present (see step 1208). If no gaps are present as depicted in FIG. 5, then machining depth 2202 may be used again when machining subsequent composite assemblies (see step 1212). However, if a gap 2402 is present between contact surface 316 and inner surface 405 of skin panel 403 as depicted in FIG. 24, which may be at any point along length 206 of composite spar 202, then machining depth 2202 may be recalculated (e.g., reduced) for machining subsequent composite spars that are fabricated (see step 1210) in order to mitigate the gap 2402.

Figure 25:
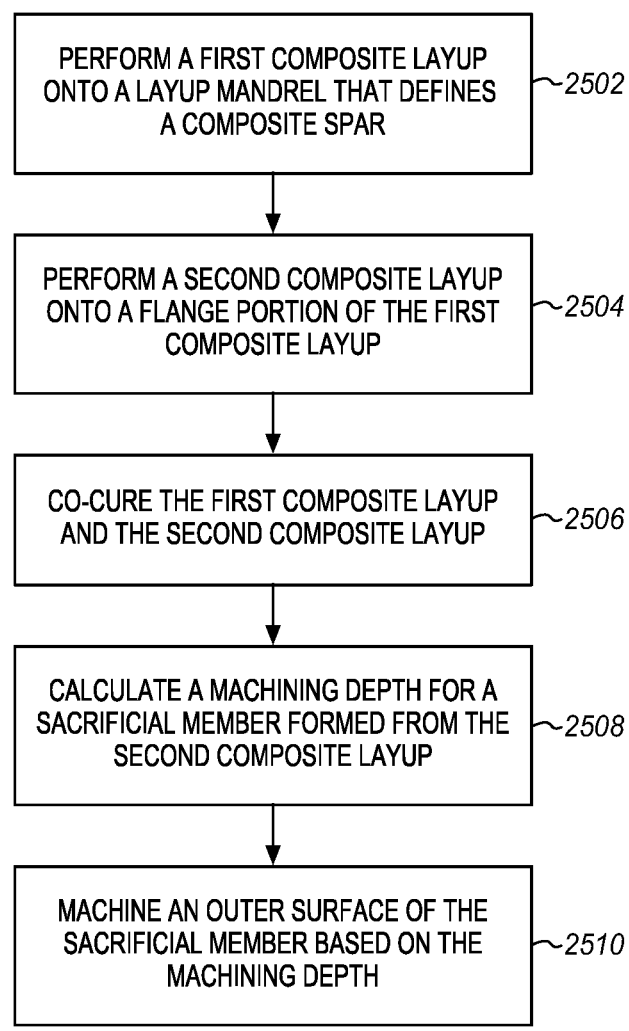
FIG. 25 is a flow chart of another method of fabricating a composite structure in an illustrative embodiment.
Figure 26:
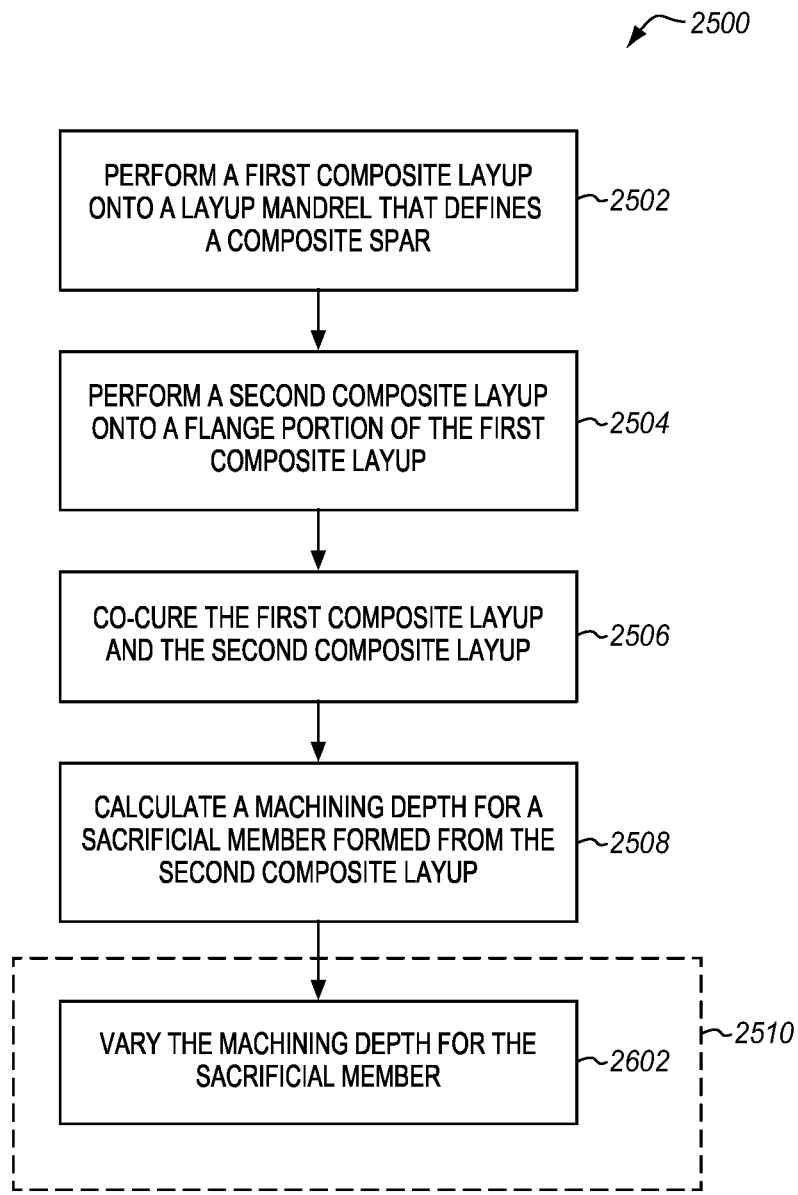
FIG. 26 depicts additional details of the method of FIG. 25 in an illustrative embodiment.
Figure 27:
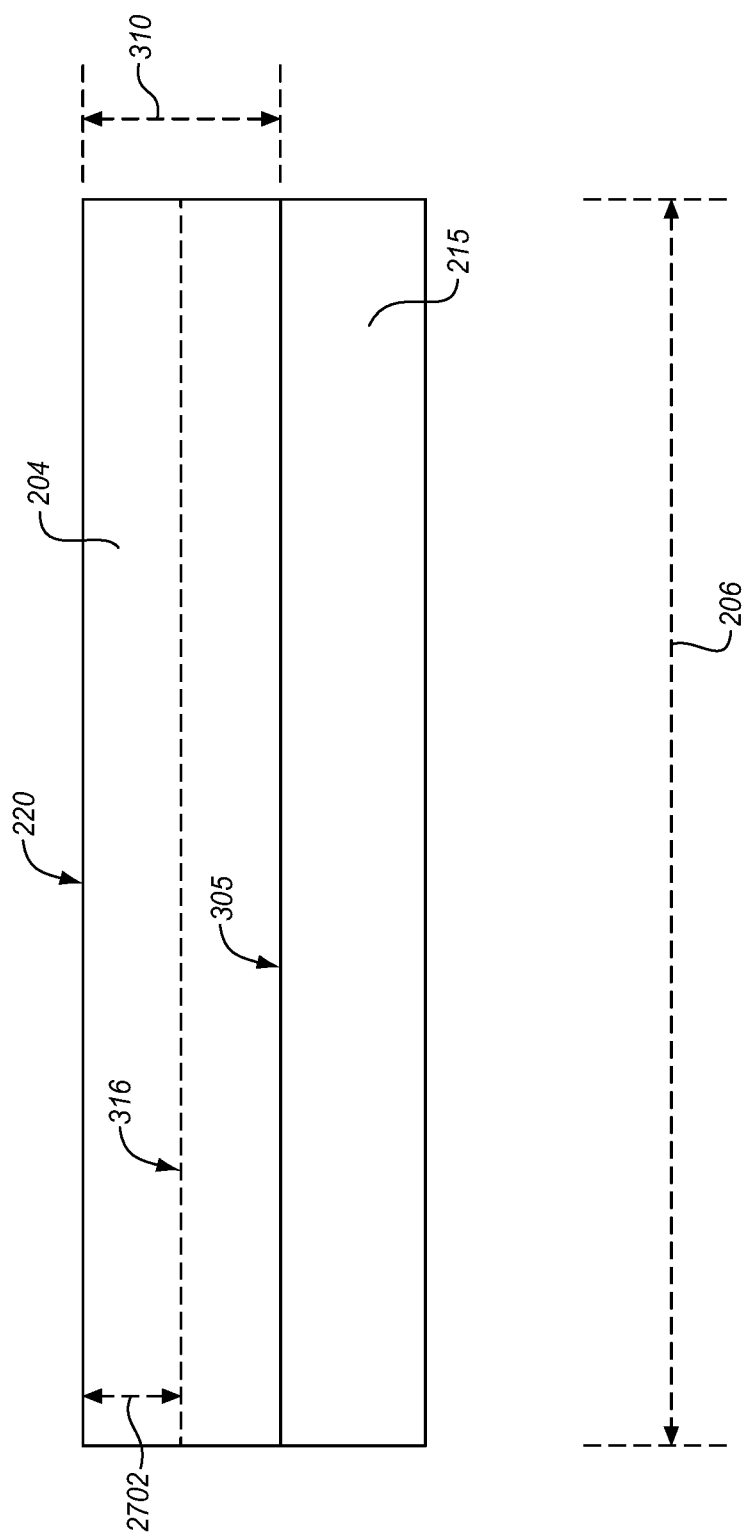
FIGS. 27-28 are cross-sectional views of the composite assembly along cut lines C-C of FIG. 2 in an illustrative embodiment.
Figure 28:
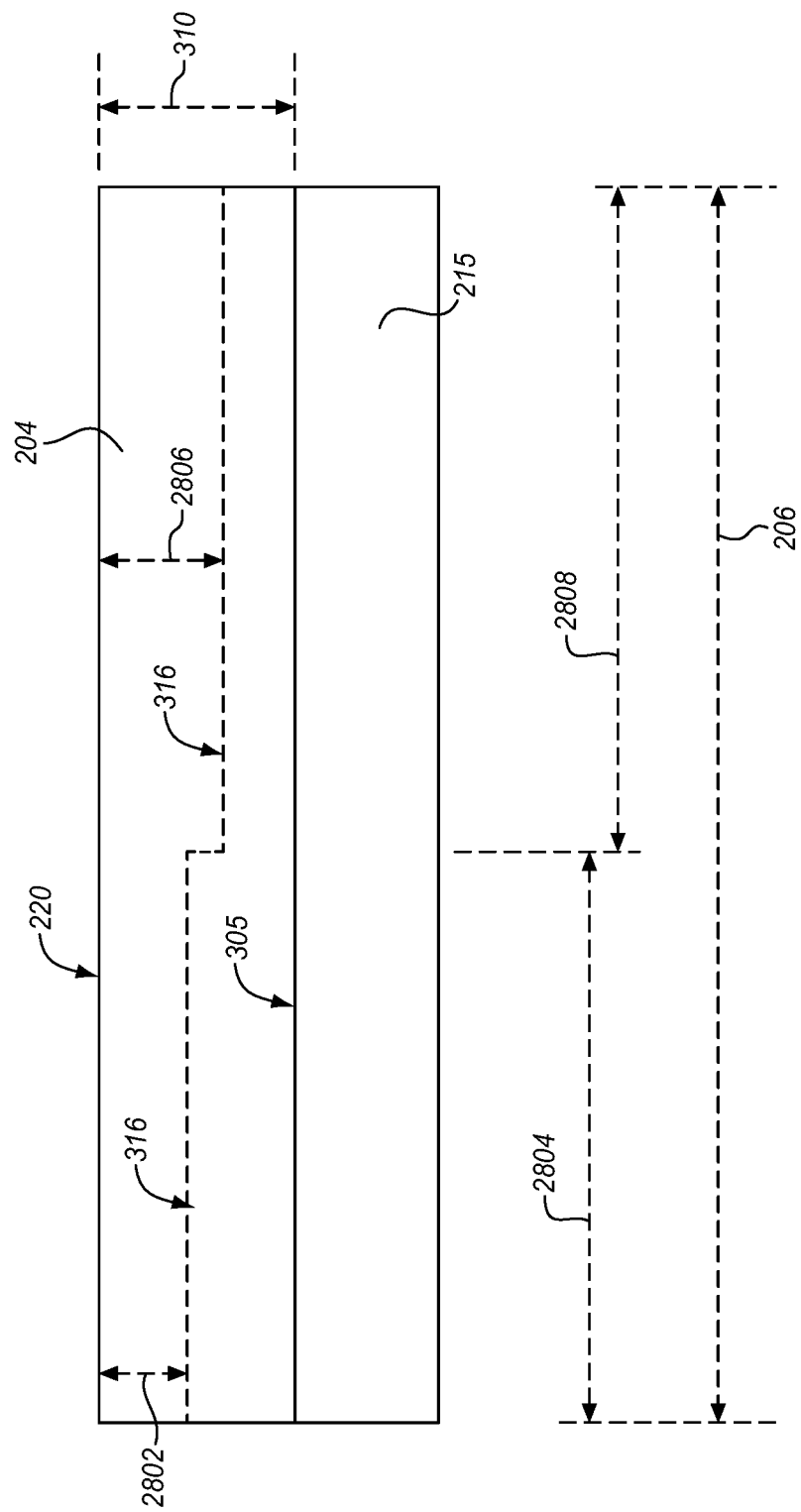

FIG. 25 is a flow chart of another method 2500 of fabricating a composite assembly 200 in an illustrative embodiment and FIG. 26 is a flow chart depicting additional details of method 2500. FIGS. 27-28 are cross-sectional views of flange 215 along cut lines C-C of FIG. 2 in illustrative embodiments.

Figure 15:
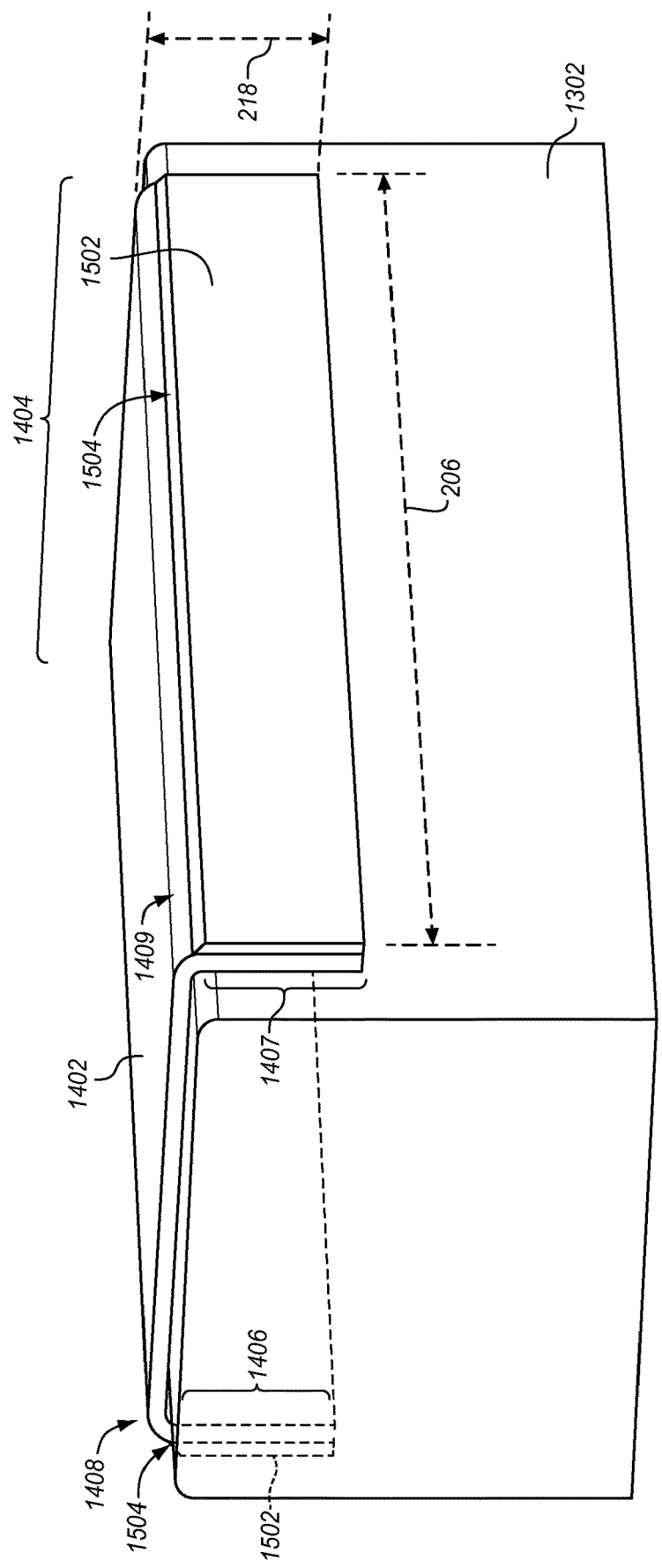

Step 2502 of method 2500 comprises performing first composite layup 1402 onto layup mandrel 1302 (see FIG. 14), which defines the contour of composite spar 202. This step may be similar to step 602 of method 600 previously described. Step 2504 comprises performing second composite layup 1502 onto flange portion 1406 and/or flange portion 1407 of first composite layup 1402, as depicted in FIG. 15. This step may be similar to step 604 of method 600, previously described.

Step 2506 comprises co-curing first composite layup 1402 and second composite layup 1502. This step may be similar to step 606 of method 600, previously described. The result of this process is composite assembly 200 of FIG. 2.

Step 2508 comprises calculating a machining depth for sacrificial member 204 based on estimated spacing tolerances between flange 215 of composite spar 202 and skin panel 403 for aircraft structure 400, and step 2510 comprises machining outer surface 220 of sacrificial member 204 based on the machining depth.

In some cases, a machining depth 2702 is constant along length 206 of composite spar, as depicted in FIG. 27. In other cases, the machining depth may vary along a portion of length 206 of composite spar 202 (see step 2602 of FIG. 26), as depicted in FIG. 28. In FIG. 28, machining on outer surface 220 of sacrificial member 204 is performed to a first machining depth 2802 along portion 2804 of length 206 of composite spar 202, and machining on outer surface 220 of sacrificial member 204 is performed to a second machining depth 2806 along portion 2808 of length 206 of composite spar 202, where the depths are different. The result is that contact surface 316 of sacrificial member 204 may vary in shape along length 206 of composite spar 202. Although method 2500 has been described with respect to flange 215 of composite spar 202 and skin panel 403 of aircraft structure 400, method 2500 applies equally to flange 214 of composite spar 202 and skin panel 402 of aircraft structure 400, or any other types of structures for aircraft that utilize spars.

The use of co-cured sacrificial member 204 on composite spar 202 integrates sacrificial surfaces into flange 214 and/or flange 215, thereby eliminating the manual step of shimming spars during an assembly process. In some cases, machining of the sacrificial plies is performed based on the estimated tolerances in the stack-up of components that form aircraft structures that use spars, thereby allowing the spars to be re-purposed between different builds of the aircraft structure on the factory floor. In other cases, 3D scanning may be performed on the components of a particular assembly, which may link those specific components together for that build on the factory floor.

Figure 29:
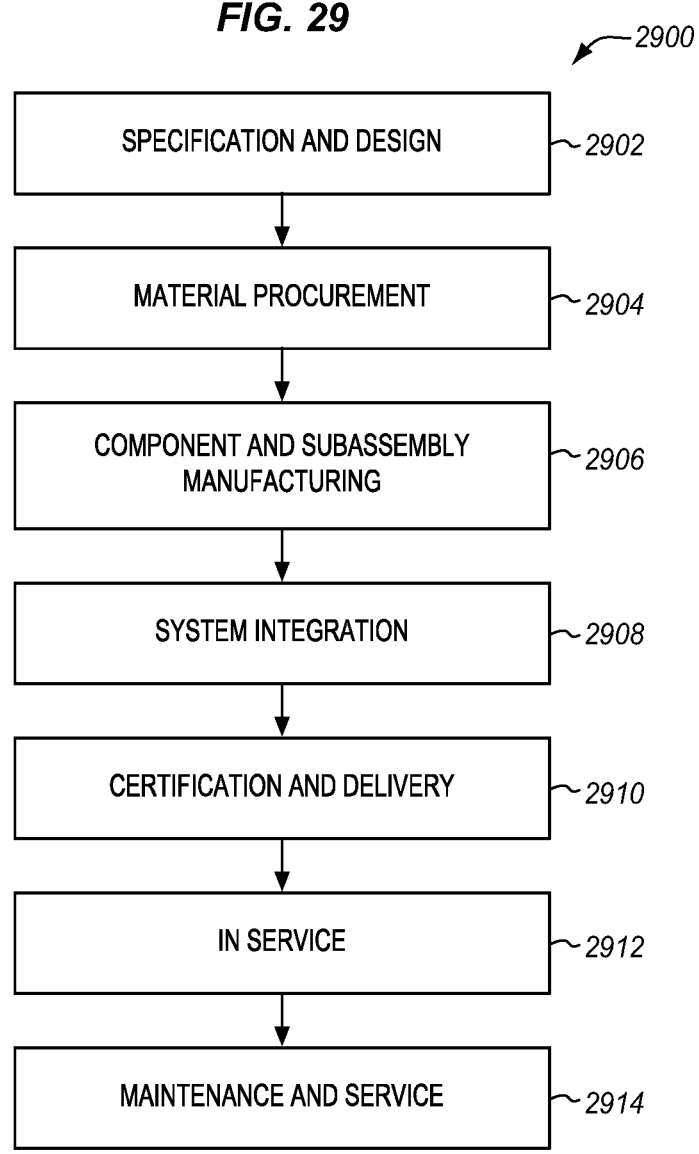
FIG. 29 is a flow chart illustrating an aircraft manufacturing and service method in an illustrative embodiment.
Figure 30:
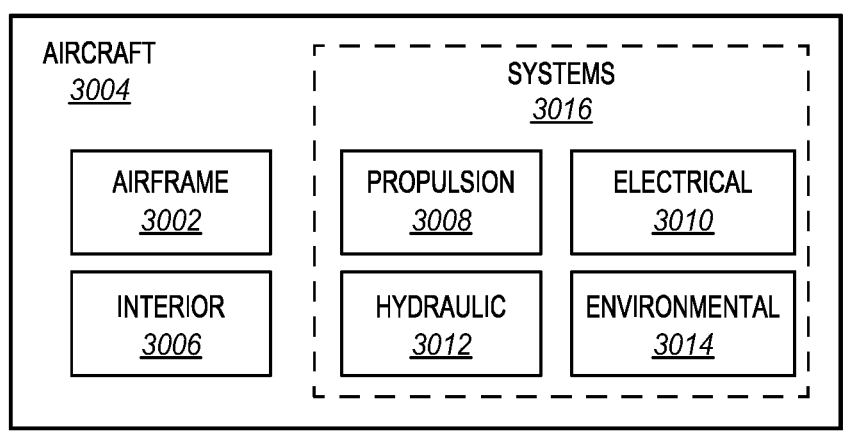
FIG. 30 is a schematic diagram of an aircraft in an illustrative embodiment.

The embodiments of the disclosure may be described in the context of an aircraft manufacturing and service method 2900 as shown in FIG. 29 and aircraft 3004 as shown in FIG. 30. During pre-production, exemplary method 2900 may include a specification and design 2902 of aircraft 3004, and material procurement 2904. During production, component and subassembly manufacturing 2906 and system integration 2908 of aircraft 3004 takes place. Thereafter, aircraft 3004 may go through certification and delivery 2910 in order to be placed in service 2912. While in service by a customer, aircraft 3004 is scheduled for routine maintenance and service 2914 (which may also include modification, reconfiguration, refurbishment, and so on).

Each of the processes of method 2900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 30, aircraft 3004 produced by exemplary method 2900 may include an airframe 3002 with a plurality of systems 3016 and an interior 3006. Examples of high-level systems 3016 include one or more of propulsion systems 3008, an electrical system 3010, a hydraulic system 3012, and an environmental system 3014. Any number of other systems may be included. Although an aerospace example is shown, the principles described in this specification may be applied to other industries, such as the automotive industry.

Apparatus and methods embodied herein may be employed during any one or more of the stages of the production and service method 2900. For example, components or subassemblies corresponding to process 2906 may be fabricated or manufactured in a manner similar to components or subassemblies produced while aircraft 3004 is in service. Also, one or more apparatus embodiments, method embodiments, or a combination thereof may be utilized during the component subassembly and manufacturing 2906 and system integration 2908, for example, by substantially expediting assembly of or reducing the cost of aircraft 3004. Similarly, one or more of apparatus embodiments, method embodiments, or a combination thereof may be utilized while aircraft 3004 is in service, for example and without limitation, to maintenance and service 2914.

Although specific embodiments were described herein, the scope is not limited to those specific embodiments. Rather, the scope is defined by the following claims and any equivalents thereof.

What is claimed is:

1. A method of fabricating a composite assembly, the method comprising:
   assembling a first composite layup that defines a web portion and flange portions for a composite spar of the composite assembly;
   assembling a second composite layup onto at least one of the flange portions to define a sacrificial member for the composite assembly;
   generating a tapered edge in the second composite layup;
   aligning the tapered edge to a bend in the first composite layup between the web portion and the at least one of the flange portions such that a thickness of the second composite layup decreases towards the bend;
   co-curing the first composite layup and the second composite layup to harden the composite assembly; and
   machining an outer surface of the sacrificial member into conformance with an inner surface of at least one skin panel for an aircraft structure to form a contact surface for the at least one skin panel.

2. The method of claim 1, wherein generating the tapered edge further comprises:
   forming a ramp having a 1:1 taper ratio.

3. The method of claim 1, wherein:
   the first composite layup and the second composite layup comprise Carbon Fiber Reinforced Polymer (CFRP) plies.

4. The method of claim 1, wherein assembling the second composite layup further comprises:
   assembling the second composite layup onto an adhesive film, wherein the second composite layup is assembled with a tapered edge; and
   transferring the second composite layup to the at least one of the flanges portions with the adhesive film contacting the at least one of the flange portions.

5. The method of claim 1, wherein assembling the second composite layup further comprises:
   assembling the second composite layup onto an adhesive film;
   cutting the tapered edge in the second composite layup; and
   transferring the second composite layup to the at least one of the flange portions with the adhesive film in contact with the at least one of the flange portions.

6. The method of claim 1, wherein machining the outer surface of the sacrificial member further comprises:
   identifying the at least one skin panel of an aircraft structure that is to be attached to the composite spar;
   calculating an interference between the inner surface of the at least one skin panel and the outer surface of the sacrificial member; and
   machining the outer surface of the sacrificial member based on the interference to bring the outer surface of the sacrificial member into conformance with the inner surface of the at least one skin panel to form the contact surface for the at least one skin panel.

7. The method of claim 1, wherein machining the outer surface of the sacrificial member further comprises:
   calculating a machining depth for the sacrificial member along a length of the composite spar based on estimated spacing tolerances between the composite spar and the at least one skin panel;
   machining the outer surface of the sacrificial member based on the calculated machining depth;
   assembling the composite spar and the at least one skin panel to form the aircraft structure;
   determining that a gap exists between the contact surface of the sacrificial member and the inner surface of the at least one skin panel; and
   modifying the machining depth to mitigate the gap in subsequent machining processes on sacrificial members for composite spars.

8. A method of fabricating a composite assembly, the method comprising:
   performing a first composite layup onto a layup mandrel that defines a contour for a composite spar of the composite assembly;
   performing a second composite layup onto a flange portion of the first composite layup defined by contour;
   cutting a tapered edge in the second composite layup;
   aligning the tapered edge in the second composite layup to a bend in the first composite layup between a web portion defined by the contour and the flange portion such that a thickness of the second composite layup decreases towards the bend;
   co-curing the first composite layup and the second composite layup to harden the composite assembly, wherein the first composite layup forms the composite spar and the second composite layup forms a sacrificial member on a flange on the composite spar;
   calculating a machining depth for the sacrificial member based on estimated spacing tolerances between the flange of the composite spar and at least one skin panel for an aircraft structure; and
   machining an outer surface of the sacrificial member along at least a portion of a length of the composite spar based on the machining depth to form a contact surface for the at least one skin panel.

9. The method of claim 8, wherein performing the second composite layup comprises:
   performing the second composite layup onto an adhesive film; and
   transferring the second composite layup to the flange portion of the first composite layup with the adhesive film in contact with the flange portion.

10. The method of claim 8, wherein cutting the tapered edge further comprises:
    forming a ramp having a 1:1 taper ratio.

11. The method of claim 8, wherein:
the first composite layup and the second composite layup comprise Carbon Fiber Reinforced Polymer (CFRP) plies.

12. The method of claim 8, wherein machining the outer surface comprises:
varying the machining depth for the sacrificial member along at least a portion of the length of the composite spar.

13. The method of claim 8, further comprising:
determining that a gap exists between the contact surface of the sacrificial member and an inner surface of the at least one skin panel; and
modifying the machining depth to mitigate the gap in subsequent machining processes on sacrificial members for composite spars.

14. The method of claim 1, wherein:
the second composite layup has an initial thickness before machining of between 0.08 inches and 0.12 inches.

15. The method of claim 1, wherein:
the second composite layup has a final thickness after machining of between 0.03 inches and 0.08 inches.

16. The method of claim 8, wherein:
the second composite layup has an initial thickness before machining of between 0.08 inches and 0.12 inches.

17. The method of claim 8, wherein:
the second composite layup has a final thickness after machining of between 0.03 inches and 0.08 inches.

18. The method of claim 5, wherein cutting the tapered edge further comprises:
forming a ramp having a 1:1 taper ratio.

19. The method of claim 1, wherein machining the outer surface comprises:
varying a depth of the machining of the outer surface of the sacrificial member.

20. A method of fabricating a composite assembly, the method comprising:
assembling a first composite layup that defines a web portion and flange portions for a composite spar of the composite assembly;
assembling a second composite layup onto at least one of the flange portions to define a sacrificial member for the composite assembly, the sacrificial member having a tapered edge;
aligning the tapered edge to a bend in the first composite layup between the web portion and the at least one of the flange portions such that a thickness of the second composite layup decreases towards the bend; and
co-curing the first composite layup and the second composite layup to harden the composite assembly.

\* \* \* \* \*